(12) United States Patent
Volach

(10) Patent No.: US 10,341,274 B2
(45) Date of Patent: *Jul. 2, 2019

(54) SYSTEMS METHODS AND COMPUTER-READABLE STORAGE MEDIA FOR MESSAGING AND PRESENCE MODIFICATION

(71) Applicant: PECAN TECHNOLOGIES INC, Tortola (VG)

(72) Inventor: Ben Volach, Haifa (IL)

(73) Assignee: PECAN TECHNOLOGIES INC., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,165

(22) Filed: Sep. 19, 2016

(65) Prior Publication Data

US 2017/0005960 A1 Jan. 5, 2017

Related U.S. Application Data

(63) Continuation-in-part of application No. 13/821,032, filed as application No. PCT/IB2011/055603 on Dec. 12, 2011, now Pat. No. 9,450,899.

(Continued)

(51) Int. Cl.
*G06F 15/16* (2006.01)
*H04L 12/58* (2006.01)

(52) U.S. Cl.
CPC .......... *H04L 51/066* (2013.01); *H04L 51/043* (2013.01)

(58) Field of Classification Search
CPC ...... H04L 51/046; H04L 51/066; H04L 67/24
See application file for complete search history.

(56) References Cited

U.S. PATENT DOCUMENTS 6,119,137 A 9/2000 Smith et al.
6,529,942 B1 3/2003 Gilbert
(Continued)

FOREIGN PATENT DOCUMENTS

DE 102005042068 A1 3/2007
EP 1646001 A1 4/2006
(Continued)

OTHER PUBLICATIONS

MIME. (Nov. 5, 2010). In Wikipedia, The Free Encyclopedia. Retrieved 16:45, Nov. 15, 2010, from http://en.wikipedia.org/w/index.php?title=MIMI&oldid=394975047.
(Continued)

*Primary Examiner* — John B Walsh
(74) *Attorney, Agent, or Firm* — Mark David Torche; Patwrite Law

(57) ABSTRACT

Systems, methods and computer-readable storage media for modifying presence and electronic messages are described; the system includes a sending terminal, at least one modification parameters database, which contains a plurality of modification parameters, at least one message modification agent and a recipient moiety, including a message user agent, in which the modification parameters in the database are updated dynamically; the method includes sending a message, obtaining at least one modification parameter, from a database which contains a plurality of modification parameters, applying to the message at least one modification parameter by a message modification agent and delivering a modified message to the recipient.

19 Claims, 4 Drawing Sheets

Related U.S. Application Data

(60) Provisional application No. 61/422,188, filed on Dec. 12, 2010, provisional application No. 61/442,180, filed on Feb. 12, 2011.

(56) References Cited

U.S. PATENT DOCUMENTS

| | | | |
|---|---|---|---|
| 6,707,890 | B1 | 3/2004 | Gao et al. |
| 7,010,757 | B2 | 3/2006 | Stana et al. |
| 7,392,289 | B2 | 6/2008 | Curry et al. |
| 9,450,899 | B2 * | 9/2016 | Volach .................... H04L 67/24 |
| 2002/0010798 | A1 | 1/2002 | Ben-Shaul et al. |
| 2002/0016818 | A1 | 2/2002 | Kirani et al. |
| 2002/0120600 | A1 | 8/2002 | Schiavone et al. |
| 2002/0147778 | A1 | 10/2002 | Dutta |
| 2003/0065729 | A1 | 4/2003 | Leinonen |
| 2003/0123104 | A1 | 7/2003 | Sasakuma et al. |
| 2005/0136908 | A1 | 6/2005 | Shell et al. |
| 2005/0159135 | A1 | 7/2005 | Kim |
| 2005/0198173 | A1 | 9/2005 | Evans |
| 2005/0278651 | A1 | 12/2005 | Coe et al. |
| 2006/0041657 | A1 | 2/2006 | Wen et al. |
| 2006/0168642 | A1 | 7/2006 | Tachizawa et al. |
| 2007/0174490 | A1 | 7/2007 | Choi et al. |
| 2008/0077675 | A1 | 3/2008 | Graef |
| 2008/0220798 | A1 | 9/2008 | Potluri et al. |
| 2008/0222254 | A1 | 9/2008 | Mukherjee |
| 2009/0106650 | A1 | 4/2009 | Haynes et al. |
| 2009/0313099 | A1 | 12/2009 | Errington |
| 2010/0169446 | A1 | 7/2010 | Linden et al. |

FOREIGN PATENT DOCUMENTS

| | | |
|---|---|---|
| EP | 1903727 A2 | 3/2008 |
| WO | 2007/014351 A2 | 2/2007 |
| WO | 2010/023192 A2 | 3/2010 |

OTHER PUBLICATIONS

RFC 2045, RFC 2046, RFC 2047, RFC 4288, RFC 4289 RFC 2049, RFC 2388; RFC 2778, RFC 2779, RFC 3761, RFC 3762, RFC 3764, RFC 4725, RFC 3920, RFC 3921, RFC 3922, RFC 3923, RFC 4854, RFC 4974, RFC 5122, RFC 3428, RFC 3856, RFC 3857, RFC 3858 and RFC 4825 available from the Internet Engineering Task Force (IETF) at http://tools.ieff.org/html/ May 2007 and sufficiently earlier than the effective U.S. filing date or any foreign priority date.

E-mail agent (infrastructure). (Sep. 1, 2010). In Wikipedia, The Free Encyclopedia. Retrieved 01:06, Nov. 15, 2010, from http://en.wikipedia.org/w/index.php?title=E-mail_agent_(infrastructure)&oldid=382207110.

MIMI. (Nov. 5, 2010). In Wikipedia, The Free Encyclopedia. Retrieved 16:45, Nov. 15, 2010, from http://en.wikipedia.org/w/index.php?title=MIMI&oldid=394975047.

XMPP Standards Foundation—XEP-0071 XHTML-IM, http://xmpp.org/extensions/xep-0071.html Jan. 1999 and sufficiently earlier than the effective U.S. filing date or any foreign priority date.

XMPP-CORE-01 https://xmpp.org/rfcs/rfc6120.html Oct. 2004 and sufficiently earlier than the effective U.S. filing date or any foreign priority date.

SIP-XMPP-IM-01 http://tools.ietf.org/html/draft-saintandre-sip-xmpp-im-01 Jan. 2008 and sufficiently earlier than the effective U.S. filing date or any foreign priority date.

SIP-XMPP-CHAT-03 http://tools.ietf.org/html/draft-saintandre-sip-xmpp-chat-03 Jan. 2008 and sufficiently earlier than the effective U.S. filing date or any foreign priority date.

XMPP-PRESENCE-02 http://tools.ietf.org/html/draft-saintandre-sip-xmpp-presence-02 Jan. 2008 and sufficiently earlier than the effective U.S. filing date or any foreign priority date.

Open Mobile Alliance Standards: Instant Messaging and Presence Service (IMPS), Presence & Availability (PAG) and Messaging (MWG) Jun. 2002 and sufficiently earlier than the effective U.S. filing date or any foreign priority date.

* cited by examiner

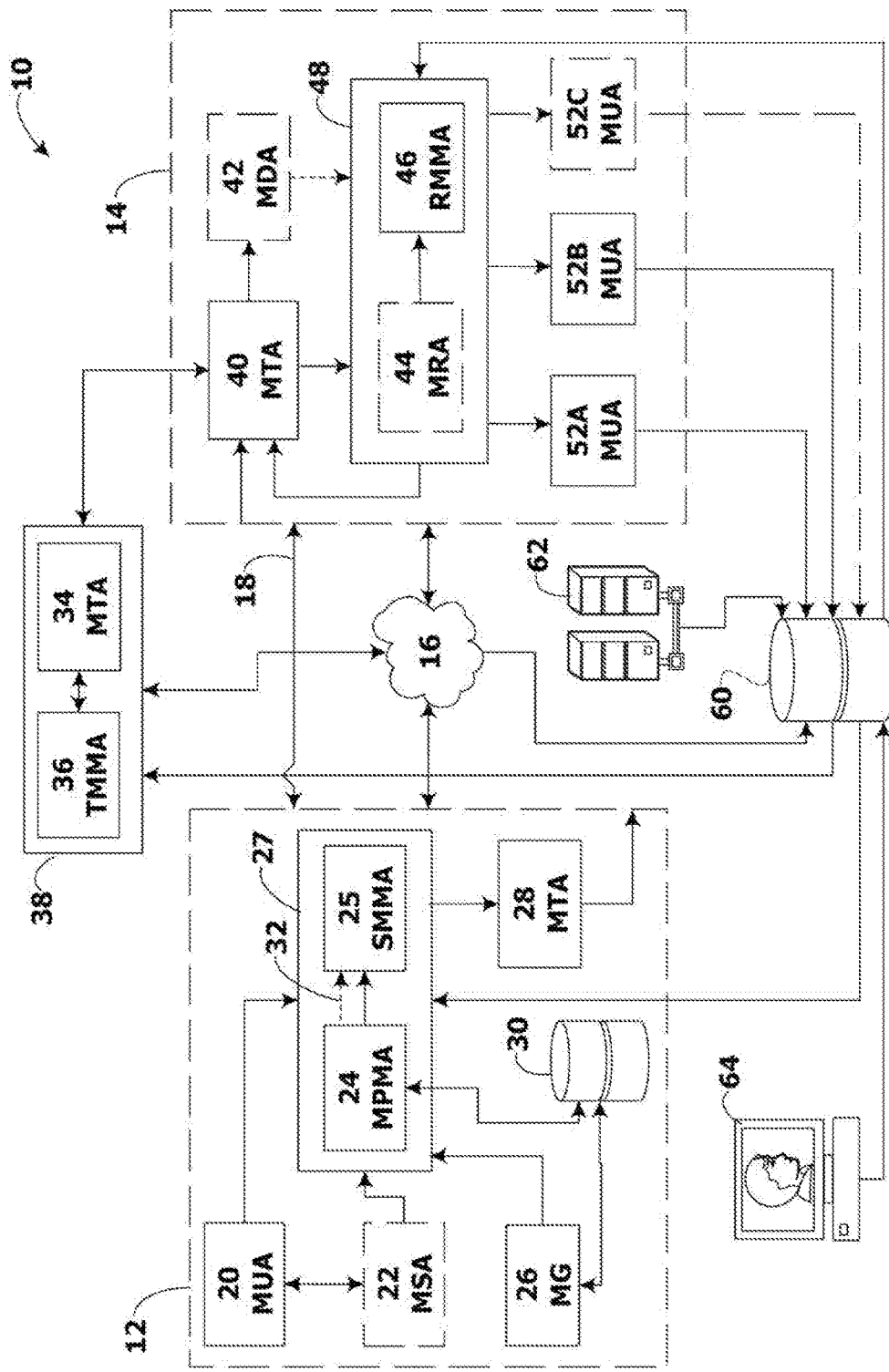

SYSTEMS METHODS AND COMPUTER-READABLE STORAGE MEDIA FOR MESSAGING AND PRESENCE MODIFICATION

CROSS REFERENCE TO RELATED APPLICATIONS

The present application is a Continuation-in-Part of US National Phase application 13/821032, filed 6 Mar. 2013, of International Patent Application Serial Number PCT/IB11/055603, filed 12 Dec. 2011, which claims the benefit of priority from Provisional Patent Application 61/422,188 filed 12 Dec. 2010 and Provisional Patent Application 61/442,180 filed 12 Feb. 2011.

TECHNICAL FIELD

In general, the present invention pertains to the arts of telecommunications and/or computer networking. In particular, the invention relates to systems and methods for modifying electronic messages.

BACKGROUND OF THE INVENTION

It is believed that the pertinent state-of-the-art is represented by: U.S. Pat. Nos. 7,392,289, 6,119,137, 7,010,757, 6,707,890 and 6,529,942; US patent application Ser. Nos. 2002/120600, 2008/077675, 2009/106650, 2002/016818, 2002/0147778, 2005/159135, 2006/168642, 2005/136908, 2006/041657, 2003/123104, 2005/0278651, 2008/0222254 and 2008/220798; German patent or patent application Ser. No. 102005042068; European patent application Ser. No. 1646001 as well as by international patent publications No. 2010/023192 and 2007/014351.

US 2005/0198173 to EVANS, of 8 Sep. 2005 discloses a system and method for controlling receipt of electronic messages by considering permission authorization information which may be associated with, or transmitted in or with the electronic messages, is provided. The permission authorization information may also take the form of an alias for recipients' actual messaging addresses. A user-defined profile according to EVANS may store the permission authorization information, other related information, and associated validation rules to be considered. Permission authorization information, rules, and/or other related information may be considered within a context of other rules and other supporting information, including sender whitelists and blacklists, address books, buddy lists, contact databases, and other data. According to EVANS permission authorization information, other related information, and rules may be added automatically as messages arrive or may be predetermined by the user, may be modified automatically or by the user, and may be made to expire automatically or by the user.

Definitions

Electronic messages or messaging, as referred to herein, should be understood as encompassing any type of telephony or computer network messaging and particularly messages transmitted over cellular networks, Internet and Ethernet. Instances of electronic messages include: the short message service (otherwise known as SMS), electronic mail (E-mail), instant messaging (IM), presence messaging, a personal message or private message (often shortened PM). Components of electronic messages as referred to herein inter alia include: text, alphanumeric data, audio files, video files, graphics and hyperlinks.

Multipurpose internet mail extensions (MIME) as referred to herein in a non-limiting manner include: RFC 2045, RFC 2046, RFC 2047, RFC 4288, RFC 4289 and RFC 2049. Open Mobile Alliance (OMA)-Instant Messaging and Presence Service (IMPS) Presence & Availability (PAG) and Messaging (MWG), standards' collection, XMPP standards' collection as referred to herein includes: RFC 3920, RFC 3921, RFC 3922, RFC 3923, RFC 4854, RFC 4974, RFC 5122. SIMPLE-Session Initiation Protocol for Instant Messaging and Presence standards' collection as referred to herein includes: RFC 3428, RFC 3856, RFC 3857, RFC 3858 and RFC 4825.

Cellular network, as referred to herein, should be understood as encompassing any type of mobile telephony system and particularly cellular networks. Instances of mobile telephony systems inter alia include networks compliant with standards known in the art as: MTS, MTA, MTB, MTC, IMTS, MTD, AMTS, OLT, Autoradiopuhelin, AMPS, TACS, ETACS, NMT, Hicap, Mobitex, DataTAC, GSM, CSD, 3GPP2, CdmaOne (IS-95), D-AMPS (IS-54 and IS-136), CDPD, iDEN, PDC, PHS, GSM/3GPP, HSCSD, GPRS, EDGE/EGPRS, 3GPP2, CDMA2000 1×RTT (IS-2000), WIDEN, 3G (IMT-2000), 3GPP, UMTS (UTRAN), WCDMA-FDD, WCDMA-TDD, UTRA-TDD LCR (TD-SCDMA), 3GPP2, CDMA2000 1×EV-DO (IS-856), HSDPA, HSUPA, HSPA+, LTE (E-UTRA), EV-DO Rev.A, EV-DO Rev.B, Mobile WiMAX (IEEE 802.16e-2005), Flash-OFDM, IEEE 802.20, LTE Advanced and IEEE 802.16.

Whenever the terms "server", "agent", "system" or "module" is used herein, it should be construed as a computer program, including any portion or alternative thereof, e.g. script, command, application programming interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

The term integrated shall be inter alia construed as—operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, Application Programming Interface (API), Inter-Process Communication (IPC), Remote Procedure Call (RPC) and/or communicating using of any standard or proprietary protocol, such as SMTP, IMAP, MAPI, OMA-IMPS, OMA-PAG, OMA-MWG, SIP/SIMPLE, XMPP, SMPP.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

SUMMARY OF THE INVENTION

Systems, methods and computer-readable storage media for modifying presence and electronic messages are described; the system includes a sending terminal, at least one modification parameters database, which contains a plurality of modification parameters, at least one message modification agent and a recipient moiety, including a message user agent, in which the modification parameters in the database are updated dynamically; the method includes sending a message, obtaining at least one modification parameter, from a database which contains a plurality of modification parameters, applying to the message at least one modification parameter by a message modification agent and delivering a modified message to the recipient.

BRIEF DESCRIPTION OF THE DRAWINGS

The present invention will be understood and appreciated more comprehensively from the following detailed description taken in conjunction with the appended drawings in which:

FIG. 1 is a schematic high-level block diagram of an embodiment of the system of the invention, implementable for modification of electronic mail;

Figure 2A:
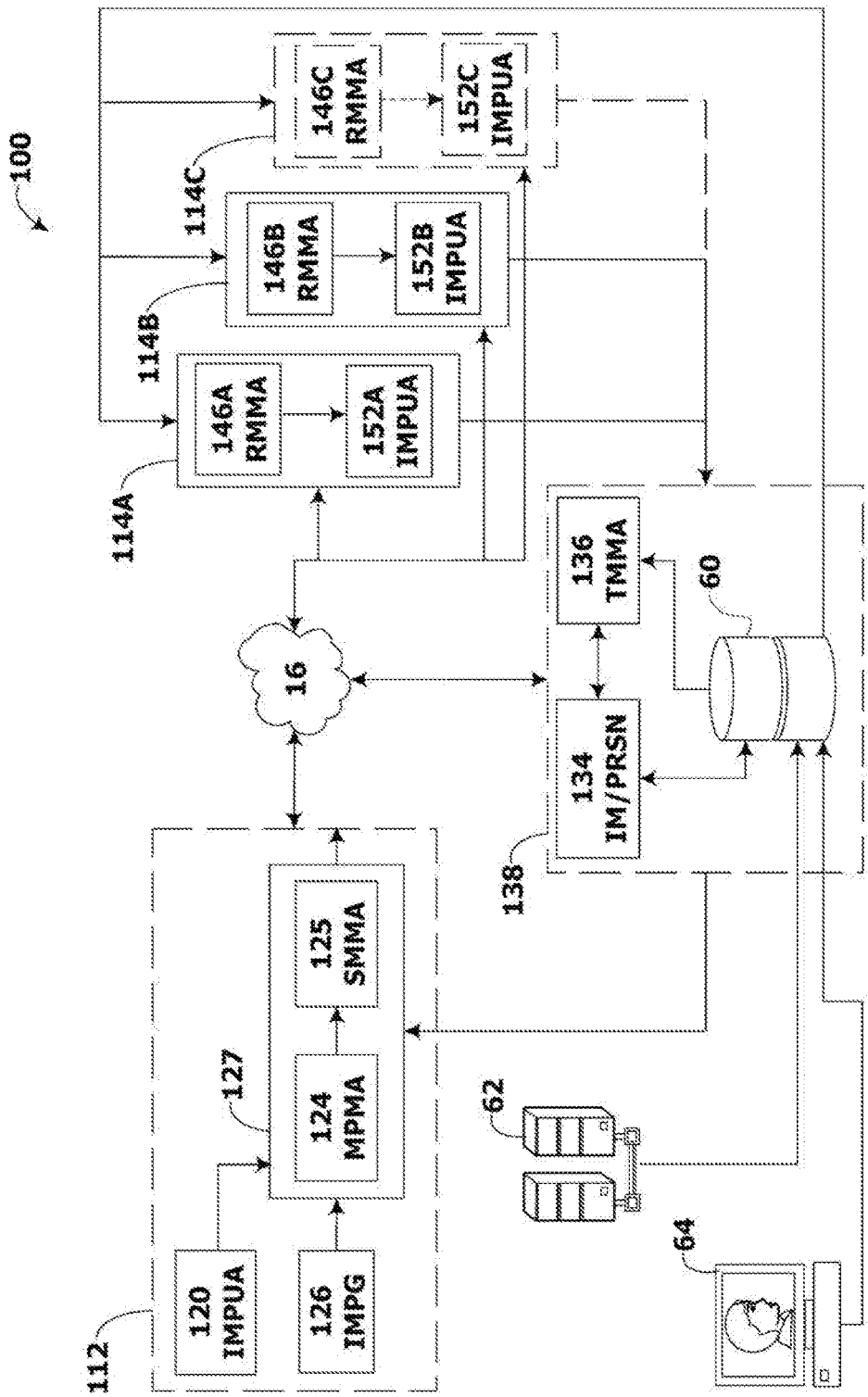
FIG. 2A is a schematic high-level block diagram of another embodiment of the system of the invention, implementable for modification of instant messages and presence messaging.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

A computer system upon which agents, modules, servers, systems or methods of the present invention may be practiced typically include a central processing unit, RAM memory and storage devices, such as a disk drive. The computer system also includes an operating system, a registry, at least one application program and typically graphical user interface (GUI), such as a display, input devices and networking terminals. The control system is typically stored in a computer-readable medium, such as a disk or read-only memory, from which it is loaded into RAM for execution. The operating system coordinates the overall operation of the computer system and acts as an interface between the application program and the various devices, such as the display. The registry provides a centralized mechanism through which various application programs can store information persistently. Preferably the information in a registry is hierarchically organized based on a path name (i.e., key) to the data. The registry could be implemented using a database or by storing the information in a file. The application program controls the displaying of various windows. For each window, such as a property page, the application program instantiates a window object 210 having functionality for managing display of the window. The application program also includes a control object corresponding to each control on the window for managing the control. The present invention is preferably implemented as various C++ classes, which define the window and control objects.

Configuration 1

Figure 3:
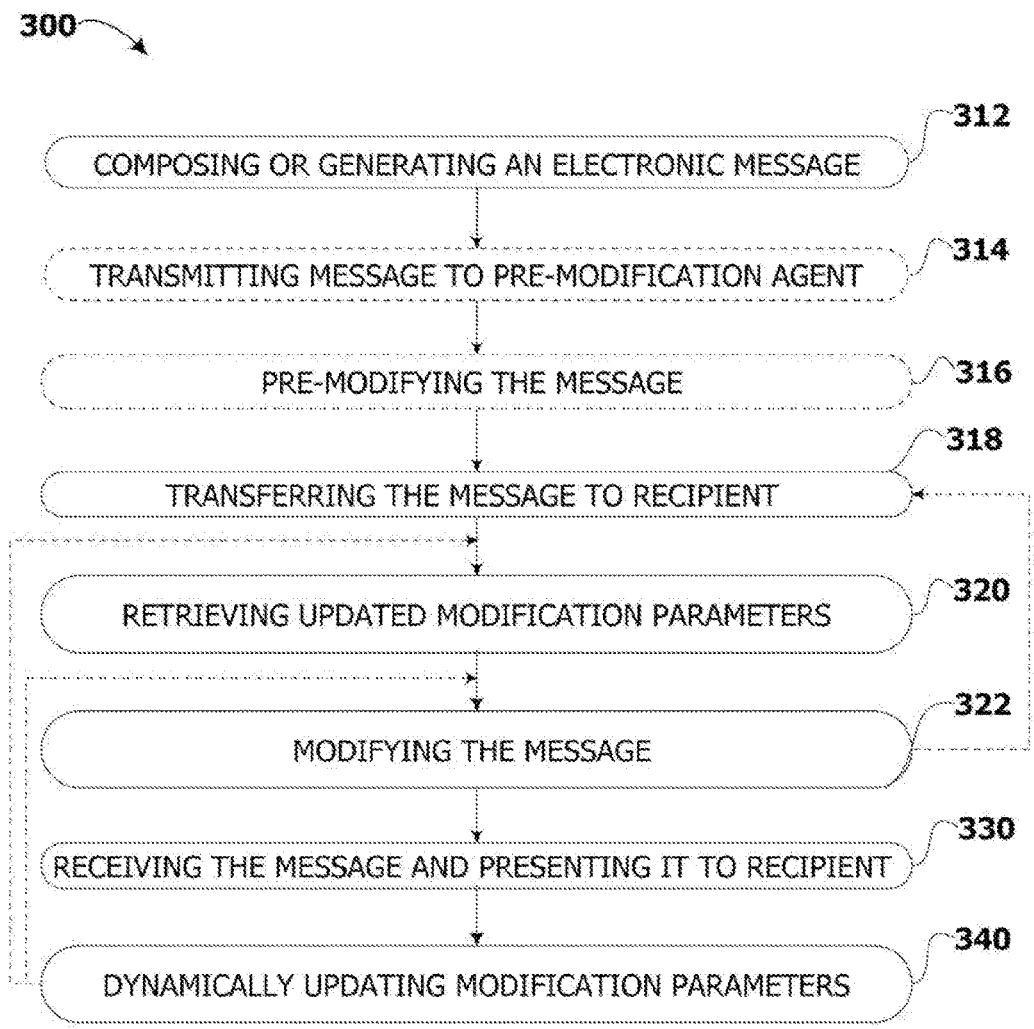
FIG. 3 is a schematic high-level flowchart of an embodiment of the method of the invention implementable for modification of electronic messages.

In accordance with some embodiments of the present invention, reference is now made to FIGS. 1 and 3 showing electronic messages modifying system 10 as well as high-level flowchart 300 of a method for modifying electronic messages. System 10, as elaborated infra, embodies an exemplary electronic mail (E-mail) modifying system. System 10 comprises sender moiety 12 and recipient moiety 14. Sender moiety 12 is connected to recipient moiety 14 through worldwide computer network 16 (frequently referred to as the internet) and/or other telecommunication link 18.

Sender moiety 12 comprises sending terminal 20. In the instance of electronic messaging modification, sending terminal 20 is a message user agent (henceforth MUA), which is frequently referred at the colloquial language as client. MUA 20 is used for the composition of the electronic message and formatting thereof. Electronic messages produced by MUA 20 typically comprise a body and header, wherein the former typically includes the content of the message intended for the view by the recipient, whereas the latter contains metadata of the message, necessary for the transmittal and delivery thereof.

The headers of electronic messages produced by MUA 20 are preferably compliant with multipurpose internet mail extensions (MIME) internet standard collection and particularly with: RFC 2045, RFC 2046, RFC 2047, RFC 4288, RFC 4289 and RFC 2049. The electronic messages produced by MUA 20 in a non-limiting manner include: text, alphanumeric data, audio files, video files, graphics and hyperlinks.

Sender moiety 12 optionally further comprises message submission agent (henceforth MSA) 22, interactively cooperating with MUA 20, essentially as known in the art. A new electronic message produced by MUA 20 is transmitted, either via MSA 22 or directly, to message pre-modification agent 24 (henceforth MPMA), during step 314.

Alternatively or additionally, message generator 26 is implemented ad hoc generating numerous electronic messages in a relatively short period of time. Message generator 26 is typically employed in corporate setups, for generating numerous messages to multiple addresses, for instance for the clientele, employees, personnel or subscribers to an information service, social network, any type of client service and alike. Message generator 26 is optionally connected to internal sender database 30, including the addresses and pre-modification parameters of the addressees, as elaborated hereunder. Electronic messages generated by message generator 26 are typically transmitted directly to MPMA 24, during step 314.

MPMA 24 receives incoming messages from MUA 20, MSA 22 or generator 26 and applies a pre-modification thereto, during step 316. A pre-modification, performed during step 316, comprises a modification of the metadata at the header of the messages and/or bodies thereof. The pre-modification, of step 316, is optionally performed in respect to at least one predefined constituent in the header and/or body of the message, intended for the recipient, without altering or modifying said constituent per se. An example of a predefined constituent in the header of the message is a field allocated within a HTML structured form, presented for the view by the recipient at the message body, in accordance with RFC 2388. The term intended as referred to herein is to be construed as inter alia intended for the view of the recipient.

The pre-modification, of step 316, is performed by prescribing a conditional action, hereinafter pre-modification parameter, in respect to one or more predefined constituents in the body and/or header of the message, of the message intended for the recipient. A pre-modification parameter is typically appurtenant to a qualitative characteristic or numerical range of a modification parameter; an exemplary detailed specification of modification parameters is provided below.

The code of the pre-modification parameters can be embedded, irrespectively, in the header and/or body of the message. The code of the pre-modification parameters embedded in the body of the message is typically hidden from the view of the recipient. The code of the pre-modification parameters is utilized by a message modification agent (hereinafter MMA); MMA include sender, recipient and/or transfer MMAs, as detailed infra.

MPMA 24 retrieves pre-modification parameters from internal sender database 30 and embeds them in the header and/or body of the message, at step 316. For instance, a pre-modification parameter can be assigned to a TRUE/FALSE value, respectively indicating the presence/absence of a particular software program installed on the recipient MUA machine. Thus if a particular software program is installed on the recipient MUA machine, namely the pre-modification parameter is TRUE, a corresponding modification parameter is applied by a MMA and a script launching the particular software program is consequently embedded in a predefined field in the body of the message. Alternatively, an IP address, universal resource identifier (URI) and/or locator (URL) for retrieving the aforementioned launching script can be embedded mutatis mutandis in a predefined field in lieu of embedding the script itself. If a particular software program is not installed on the recipient MUA machine, namely the pre-modification parameter is FALSE, a corresponding modification parameter is applied by MMA and a hyperlink for downloading the particular software program is consequently embedded in the aforementioned or other predefined field in the body of the message.

In another instance a pre-modification parameter can be assigned to a numeric range divided into three numeric sub-ranges, respectively indicating the GUI screen size and/or resolution on the recipient MUA machine. Thus if GUI screen size is within the first numeric sub-range, a corresponding modification parameter is applied by MMA and merely one third of the textual content of the message is consequently presented, by showing only the first of the three adjacent fields in which the textual content of the message is allocated. If GUI screen size is within the second numeric sub-range, a corresponding modification parameter is applied by MMA and thus the first and the second of three adjacent fields allocated for textual content are consequently presented, showing about two thirds of the textual content of the message, etc.

The predefined fields are typically allocated within a HTML structured message body, in accordance with RFC 2388, the content of which is incorporated herein by reference. Data/files necessary for the modification of the message are typically either contained within attachments of the message or obtainable from an IP address, URI and/or URL.

The pre-modified message, containing pre-modification parameters, is transmitted to message transfer agent 28 (MTA), together or alongside 32 the body of the message. From MTA 28 the message is further transferred through computer network 16 and/or other telecommunication link 18 to recipient moiety 14, during step 318.

Configuration 2

Alternatively or additionally, sender moiety 12 of system 10 comprises sender modification agent (SMMA) 25. SMMA 25 receives incoming messages from MUA 20, MSA 22, message generator 26 or MPMA 24 and applies a modification hereto, during step 322. The modification of the messages by SMMA 25 comprises a modification of the message body and/or the metadata at the header thereof. The modification of the messages by SMMA 25 is performed, during step 322, by modifying a constituent of the message intended for the recipient.

The modification of the message body is applied to at least one predefined constituent in the body of the message. The modification of the messages by SMMA 25 is performed, during step 322, in accordance with at least one modification parameter of the recipient, retrieved from database 60, during step 320. Database 60 can be integrated within recipient moiety 14 or form an independent constituent of system 10. The modification of the messages by SMMA 25 is optionally performed, during step 322, in accordance with pre-modification parameters prescribed by MPMA 24, during step 316.

The modification parameters, utilized for the modification of the messages by SMMA 25, typically refer to relatively constant and/or static qualities/characteristics of the recipient profile and/or properties of the recipient MUA machine, such as the model/type of the hardware and/or configuration thereof on the recipient MUA machine and/or user profile properties. The reason for preferring modification parameters that refer to relatively constant qualities/characteristics is that a message transmitted from sender moiety 12 at a given time can be retrieved by, accessed by and/or pushed to the recipient indefinite time thereafter. Therefore, the modification of the messages by SMMA 25, during step 322, which actually and unconditionally alters the content of the message and/or body thereof viewable by the recipient, is preferably performed in accordance with qualities/characteristics which are less probable to change until the message is actually retrieved by, accessed by and/or pushed to the recipient.

For instance, if the recipient MUA is a Macintosh type of machine or operating system, a UNIX executable script is embedded in a predefined field, typically allocated within a HTML structured message body, in accordance with RFC 2388. In other instance if a profile property indicates a particular gender of the user, gender-specific textual/graphical information is included in the body and/or header of the message; alternatively, if the gender of the user cannot be established, unisex information is included in the body and/or header of the message.

In some configurations MPMA 24 and SMMA 25 are integrated into unitary module 27. In other configurations MPMA 24 is integrated (not shown) with message generator 26, MUA 20 and MSA 22, thereby initially producing messages containing pre-modification parameters, during a combined step 312 and 316. Therefore, message generator 26, MUA 20 and/or MSA 22 is optionally connected to internal sender database 30 to retrieve pre-modification parameters therefrom, during step 320. In yet other configurations SMMA 25 is integrated (not shown) with MTA 28.

Subsequently, messages pre-modified by MPMA 24, during step 316, and/or modified by SMMA 25, during step 322, are transmitted to MTA 28, together or alongside 32 the body of the message. From MTA 28 the message is further transferred through computer network 16 and/or other telecommunication link 18 to recipient moiety 14, during step 318. In recipient moiety 14, messages are received by recipient MTA 40. The transfer of the messages from MTA 28 to recipient MTA 40, during step 318, is performed essentially in accordance to methods known in the art.

Configuration 3

In some embodiments, system 10 is configured as an external service provider adapted for the modification of messages sent form moiety 12 to moiety 14. A message sent from MTA 28, during step 318, and intended for a particular recipient MTA 40 is directed first to MTA 34, via internet 16, as an external service provider. The directing of the message sent from MTA 28 and intended to a particular recipient MTA, such as 40, to MTA 34 instead is preferably achieved by assigning the IP address of MTA 34 as mail exchanger record (MX record) or a service record (SRV record) on the domain name system (DNS); thereby upon resolving with the DNS the destination IP address of a particular recipient, MTA 28 receives the IP address/port of MTA 34 and consequently directs the message thereto, during step 318.

Incoming message received by MTA 34, during step 318, are forwarded to transfer MMA (TMMA) 36. TMMA 36 preferably retrieves an updated set of modifications parameters from database 60, during step 320, and subjects the message forwarded from MTA 34 to a modification, during step 322. The modification of the messages by TMMA 36 is performed, during step 322, in accordance with modification parameter of the recipient as retrieved from database 60, during step 320. Database 60 can be integrated within recipient moiety 14 or form an independent constituent of system 10. The modification of the messages by TMMA 36 is optionally performed, during step 322, in accordance with pre-modification parameters prescribed by MPMA 24, during step 316.

Messages modified by TMMA 36, during step 322, are returned to MTA 34 and thereafter transmitted to recipient MTA 40, during step 318, to be thereafter retrieved by, accessed from and/or pushed to recipient MUAs 52 A-C, during step 330; the term MUAs as used herein should be construed as any number of MUAs larger than one. In some configurations TMMA 36 and MTA 34 are integrated in unitary module 38, as an external service provider in system 10.

In some configurations, an incoming message is received by MTA 40 in recipient moiety 14 during step 318, and thereafter forwarded to TMMA 36 or module 38, modified therein, during step 322, and subsequently returned to MTA 40, during iterative step 318, in order to be stored in MTA 40 or MDA 42, until retrieved by, accessed from and/or pushed to recipient MUAs, during step 330. In some instances, an incoming message is transmitted by MTA 40 to TMMA 36 or module 38 and/or returned from TMMA 36 or module 38 to MTA 40 via internet 16, during iterative step 318, whereas in other instances the message is transmitted by MTA 40 to TMMA 36 or module 38 and/or returned from TMMA 36 or module 38 to MTA 40 via a communication link other than internet 16; for example by employing a proxy configuration, as an alternative of iterative step 318.

Configuration 4

In recipient moiety 14, messages received by recipient MTA 40, during step 318, are further transmitted to recipient MMA (RMMA) 46. Alternatively or additionally, messages received by recipient MTA 40 are transmitted to and stored by delivery agent 42 (hereinafter MDA); MDA and MTA is to be construed as including a storage facility, e.g. mailbox, etc. From MDA 42 messages are retrieved by mail retrieval agent 44 (hereinafter MRA). Noticeably, the step of retrieving the message from MDA 42 to MRA 44 is a pull step; therefore, an incoming message is stored by MDA 42 until it is retrieved by MRA 44 as a pull step. Messages received by recipient MTA 40 or retrieved by MRA 44 from MDA 42 are further transmitted to RMMA 46. If the configuration of recipient moiety 14 does not employ MDA 42 and/or MRA 44, the messages received by recipient MTA 40 are transmitted to RMMA 46, typically as a push step.

MRA 44 and RMMA 46 are optionally integrated into unitary module 48, receiving messages pushed from MTA 40 or retrieved from MDA 42. In some configurations MDA 42 is included in unitary module 48. Preferably the configuration of recipient moiety 14 employs MRA 44, entailing the aforementioned pull step, for an effective handling modification of messages for a plurality of recipient MUAs, during step 330, as will be elaborated infra.

RMMA 46 and/or unitary module 48 is connected to database 60 which can be integrated within recipient moiety 14 or form an independent constituent of system 10. Database 60 contains modification parameters of the recipient and/or recipient MUA machine. Modification parameters are typically retrieved from database 60 by RMMA 46 and/or unitary module 48, during step 320. Modification parameters are typically retrieved from database 60 by RMMA 46 and/or unitary module 48, during step 320, a retrieval of at least one type, of the two types explained immediately hereafter.

Retrieval of the first type is defined as the retrieving, of modification parameters, by RMMA 46 and/or unitary module 48 from database 60, performed upon the receipt of an incoming message by MTA 40, RMMA 46 or unitary module 48, during step 318. Retrieval of the second type is defined as the retrieving, of modification parameters, by RMMA 46 and/or unitary module 48 from database 60, performed upon an access or retrieval of a message by MUAs 52 A-C from MRA 44, RMMA 46, module 48 or MDA 42, during or prior to step 330. A retrieval of the first type and/or second type, optionally, initiates an active dynamical update process of database 60, during step 340, as explained below. A retrieval of the first type and/or second type is mutatis mutandis performed by TMMA 36.

RMMA 46 and/or module 48 receive the incoming messages, during step 318, and subject the same to at least one modification of three types, during step 322. A modification of the first type is performed during step 322 in accordance with pre-modification parameters prescribed by MPMA 24 during step 316. The modification of the first type is typically performed either upon the receipt of an incoming message by MTA 40, RMMA 46 or module 48, during step 318, or upon an access or retrieval of a message by MUAs 52 A-C from MRA 44, RMMA 46, module 48 or MDA 42, during step 330.

A modification of the second type is preferably performed during step 322 upon the receipt of an incoming message by MTA 40, RMMA 46 or module 48, during step 318. The modification of the second type is typically accompanied by and performed in accordance with modification parameters retrieved from database 60, during step 320, a retrieval of the first type. Subsequently to the modification of the second type, during step 322, the modified message is stored at MRA 44, RMMA 46, module 48 or MDA 42 until retrieved by, accessed from and/or pushed to recipient MUAs 52 A-C, during step 330. In some configurations, an incoming message is forwarded from MTA 40 to RMMA 46, modified therein, during step 322, and subsequently returned to MTA 40 in order to be stored in MTA 40 or MDA 42, until retrieved by, accessed from and/or pushed to recipient MUAs 52 A-C from MRA 44, RMMA 46, module 48 or MDA 42, during step 330.

A modification of the third type is preferably performed during step 322 upon an access to, retrieval by or pushing of a message to MUAs 52 A-C from MRA 44, RMMA 46, module 48 or MDA 42, during step 330. The modification of the third type is typically accompanied by and performed in accordance with modification parameters retrieved from database 60 during step 320, a retrieval of the second type. The modification of the third type during step 322 implies an availability of more updated modification parameters, since the modification of the third type is effected promptly prior to an access or retrieval of a message by MUAs 52 A-C, during step 330. The modification of the third type is preferably implemented in recipient moiety 14 the configuration of which employs MRA 44, wherein the modification of step 322 is performed conjointly with a pull step 330, during which a message is retrieved from MDA 42 by MRA 44 or from MTA 40 by MUAs 52 A-C, providing for effectively handling a modification of messages for a plurality of recipient MUAs, as described below.

A modification of the fourth type is typically performed in accordance with modification parameters other than these retrieved from database 60 during step 320. Modification parameters for the modification of the fourth type during step 322 are typically either obtainable from ubiquitous sources, such as the present time and date or extracted from appurtenant attributes of the message itself, for instance the language of the message, the top-level domain (TLD) and/or the domain name of the recipient's message address, etc.

The modification of the fourth type performed during step 322 is applicable to SMMA 25 and/or TMMA 36 and/or RMMA 46. The modifications of the first, second and third types performed during step 322 are mutatis mutandis applicable to TMMA 36. The modifications of the second and/or third types performed during step 322 are optionally combined with the modification of the first and/or fourth types performed during step 322 as well.

Messages modified by RMMA 46 or module 48 during step 322 are further transferred to, retrieved by, accessed by and/or pushed to recipient MUAs 52 A-C, during step 330, essentially in accordance with methods known in the art and preferably in accordance with post office protocol (POP) and/or internet mail access protocol (IMAP), standardized in RFC 1064, and/or MAPI and/or MAPI/RPC.

Modification Parameters and Dynamic Update Thereof

Modification parameters as referred to herein typically comprise several main categories. The first category of modification parameters pertains to various qualities/characteristics of recipient MUA device. Qualities/characteristics are obtained from the device the recipient MUA is running on, exemplarily in accordance to the methods disclosed in US Patent Application Ser. No. 2005/136908, entitled "SYSTEM AND METHOD TO QUERY SETTINGS ON A MOBILE DEVICE," the content of which is incorporated herein by reference, or in accordance with other methods known in the art. Modification parameters of the first category are optionally associated with a physical IP address, IMEI address or MAC address of the device of recipient MUA, such as MUAs 52 A-C.

Modification parameters of the first category pertaining to various qualities/characteristics of recipient MUA device include but are not limited to the selected from the list below:

the type and/or model of the hardware components and/or configuration thereof on the recipient MUA machine (an example of a static quality/characteristic), such as the type of the machine (e.g. mobile phone, personal computer, etc.); GUI screen type, size or resolution, 2D or 3D screen; camera, processor power, random access memory size, type of input devices e.g. screen accessed with remote control, touch screen, keyboard, voice recognition, or motion sensor, as well as other hardware profile information;

the state and/or capacity of selected hardware components, such as the presence of external power source, electrical battery state, available storage space;

the type and/or model of the firmware stored in read only memory;

dynamic properties, such as GPS positioning, camera connectivity, voice recognition state, speaker phone on/off, attached to headset, attached to projector, currently in motion e.g. average speed, roaming, etc.;

the operating system running on the device and version thereof;

the list of device programs installed, their respective versions and configurations;

list of content stored on the device such as music, movies, photos, ringtones and alike.

the preferences and/or configuration of the device, e.g. language settings, Wi-Fi on/off, 3G availability.

The second category of modification parameters pertains to various qualities/characteristics of the service provided by the network operator for recipient MUA device. Modification parameters of the second category can be associated with a unique ID such as: logical IP address, IMEI address, MAC address, email address, any other user credentials of the recipient MUA device. Modification parameters of the second category can be automatically resolved, essentially as known in the art, upon a connection of a particular recipient MUA device to a network operated by a specific service provider, such as service provider 62. Modification parameters of the second category are often identified with a particular client/user of a service provided by a network operator, such as a connection to internet from a particular Wi-Fi point.

Modification parameters of the second category pertaining to various qualities/characteristics of the service provided by the network operator of the recipient MUA device include but are not limited to selected from the list below:

ambient conditions, strength and/or availability of the cellular network signal; (an example of a dynamic quality/characteristic), the current or most common geographical location and/or present time;

availability and/or the bandwidth of network connection;

types of services the user is subscribed to and/or other customer profile related information, e.g. credit available, data package type.

The third category of modification parameters pertains to user profile properties. Modification parameters of the third category are typically associated with a particular messaging account and/or particular person or entity. Thus a messaging account managed on MTA 40 can be assigned with a set of modification parameters that are characteristic of the properties and/or preferences of the account addressee. Modification parameters of the third category pertaining to user account profile, inter alia include:

messaging account, e.g. email address, establishing a Unique Identity (hereinafter UID) of the user; messaging account should be interpreted to encompass any account and/or profile entity of the recipient, typically associated with an individual person; this particularly includes any type of username at a specific domain, while username is optionally an email address, for instance a username at Facebook domain might be any email address, inter alia of a syntax xxxx@yyyy.com.

personal user information, such as gender, age, wearing glasses, hearing impairment, other disabilities, marital status, hometown, language preference, etc.;

Dynamic parameters of the user, e.g. awake or asleep, heart rate, mood, driving, running speed, etc.;

preferences specified at the account;

message box quota and current available size, last time and device accessed the accessed messaging account, number of devices occasionally used;

types and extents of activities, as analyzed by the messaging account manager.

The fourth category of modification parameters pertains to various qualities/characteristics of external service providers. External service providers in a non-limiting manner include information services, subscription services, social networks and consumer services the recipient is registered to and/or subscribed to. Modification parameters of the fourth category can be associated with the message address or any other credentials of the recipient, a unique ID of the service provider as well as with logical IP address, IMEI address or MAC address of the MUA device.

Modification parameters of fourth category pertaining to service providers, inter alia include:

personal user information, such as gender, date of birth, wearing glasses, hearing impairment, other disabilities, marital status, hometown, language preference, sexual preference etc.;

types and extents of activities, as analyzed by the service provider;

browsing and/or usage patterns and history;

contact list and social graph;

device currently used and devices used before;

advertisement consumed on the particular service;

purchase history;

available credit;

preferences specified by the user.

Modification parameters of the aforementioned four categories are stored within database 60 in respectively allocated sub-entries. Modification parameters of each category are preferably stored, allocated within a respective sub-entry. Each sub-entry contains a list of modification parameters pertaining for a MUA devices, network operators, user/account profile properties or service providers, alongside the values thereof. Modification parameters are typically either qualitative data, specifying characteristics/properties of recipient MUA machine and/or user profile, or quantitative data, specifying the numerical values, such as size, capacity, strength, etc.

Modification parameters from different categories can be combined in a single composite entry, by selecting parameters from different sub-entries. Composite entry is typically either static or dynamic. Static composite entries refer to relatively constant combinations of characteristics/properties of MUA devices, network operators, user account properties and/or service providers, represented by modification parameters from different categories, in respective sub-entries. Static composite entries are typically created and preferably prompted as a part of an installation and/or setup of MUA application on a particular device. Dynamic composite entries refer to somewhat transient combinations of MUA device, network operator and/or user properties. A dynamic composite entry is typically a characteristic of a web-based MUA interface, otherwise known as webmail, wherein the same user profile properties are frequently combined with different MUA devices and/or network operators. A dynamic composite entry is typically a characteristic of mobile phones and laptop computers, wherein the same user profile properties and MUA device are frequently combined with different network operators and service providers. The combination of the static or dynamic entries is typically performed by an association of the constituent sub-entries with the UID of the user.

Modification parameters in database 60 are dynamically updated, during step 340, from recipient MUAs 52 A-C machines, upon a process actively initiated by recipient MUAs 52 A-C machines, in accordance with a predefined schedule and/or triggered by a prescribed event and/or change in MUA machine registry, such as the last device operable for running recipient MUA, turning the recipient MUA device on, logging into MUA device operating system, launching MUA application, installing of a new application, low disk alert, computer program update, retrieving of and/or accessing to a message by MUAs 52 A-C, during step 330, etc. The update process can be actively initiated by some computer program other than MUAs 52 A-C running on the recipient MUA machine.

Alternatively or additionally, modification parameters in database 60 are updated, during step 340, upon a process actively initiated by service provider 62, providing computer network communication services for MUAs 52 A-C machines. The update of modification parameters by service provider 62, during step 340, is typically either initiated in accordance with a predefined schedule and/or triggered by a prescribed event, such availability/unavailability of recipient MUA machine on a cellular network, positioning of the recipient MUA machine in a particular geographical location, limitations on data package by network operator, change and/or excess of a threshold network bandwidth, change and/or excess of a threshold on network access tariffs, subscription to an online information service, etc.

Alternatively or additionally, modification parameters in database 60, during step 340, are updated by the holder of the account for messaging service, such as the manager of the recipient account on MTA 40. Alternatively or additionally modification parameters are pushed into database 60, during step 340, from internet 16.

Alternatively or additionally, modification parameters in database 60 are updated, during step 340, by incurring internet 16, service provider 62 and/or MUAs 52 A-C machines, upon a process actively initiated by the database management system (DBMS) of database 60. The update of modification parameters, during step 340, actively initiated by the DBMS of database 60 is typically performed in accordance with a predefined schedule.

Alternatively or additionally, modification parameters in database 60 are updated, during step 340, by various service providers. Modification parameters updated by service providers are typically pushed to the DBMS of database 60 from internet 16, during step 340. Optionally modification parameters from service providers are retrieved actively by a process initiated by the DBMS of database 60, during step 340.

Preferably the dynamic update of modification parameters in database 60, performed during step 340 upon a process initiated by the DBMS of database 60 by actively incurring internet 16, service provider 62 and/or MUAs 52 A-C machines, is triggered by and optimally completed prior to the retrieval of modification parameters during step 320, by SMMA 25 and/or TMMA 36 as well as the aforesaid retrieval during step 320 of the first type and/or second type performed by RMMA 46. The retrieval of modification parameters by SMMA 25, TMMA 36 as well as the aforesaid retrieval of the first type and/or second type performed by RMMA 46 during step 320 is inter alia performed via internet 16.

Alternatively or additionally, modification parameters in database 60 are updated during step 340 by an appliance. In some instances, an appliance is a refrigerator or a computerized warehouse inventory system, capable of monitoring the amount and/or the condition of the goods store therein. Modification parameters updated by an appliance are typically pushed during step 340 to the DBMS of database 60 from internet 16. Optionally modification parameters from an appliance are retrieved actively during step 340 by a process initiated by the DBMS of database 60.

Modification of Messages for Multiple Recipients

Should recipient moiety 14 comprise a plurality of recipient MUAs 52 A-C machines, the following system configurations and/or respective embodiments of the method of the present invention are implementable for handling a modification of messages delivered thereto.

In some embodiments messages modified, during step 322, chiefly by SMMA 25, prior to the transmittal thereof to the recipient, during step 318. Message intended to a recipient employing multiple recipient MUAs, such as MUAs 52 A-C, typically running on different machines, modified by SMMA 25 during step 322 in accordance with modification parameters allocated primarily within composite entries in database 60, comprising a plurality of sub-entries representing the respective combinations of characteristics/properties of MUA devices, network operators, user account profile and/or service providers, associated with particular UID. In such a case, upon retrieval of modification parameters during step 320, SMMA 25 receives from database 60 a plurality of dynamic or static composite entries associated with a given recipient/address/account and consequently generates a respective number of copies from the message, during step 322, thereafter referred to as a plural modification. Each copy is modified in accordance with the combination of modification parameters in a particular composite entry. The body or the metadata of the message is altered to indicate the identity of the respective composite entry in accordance with whose parameters the modification was performed during step 322. Thereafter the modified copies of the message are transmitted to the recipient during step 318.

The plurality of the modified copies of the message is received by MTA 34, MTA 40 or module 38 and/or stored therein or in MDA 42, during step 318, until retrieved by, accessed from and/or pushed to recipient MUAs 52 A-C, during step 330. Upon accession, retrieval or pushing of a message by/to a MUA, of MUAs 52 A-C during step 330, the particular combination of characteristics/properties of MUA devices, network operators, user account profile and/or service provider is established and consequently only the respective copy of modified message with identity corresponding to respective composite entry is selected for step 330. In such a case TMMA 36, module 48, RMMA 46, MTA 40, MRA 44 or module 48 is furnished with capability of selecting the particular copy of the modified message at step 330 corresponding to the identity of the respective composite entry it was initially modified for during step 322.

The plural copies of the modified message stored by MDA 42, MTA 34, MTA 40 or module 38 are managed, mutatis mutandis, in accordance with methods known in the art and particularly in accordance with post office protocol (POP) and/or internet mail access protocol (IMAP), standardized in RFC 1064, and/or MAPI and/or MAPI/RPC.

In some embodiments messages modified primary by TMMA 35, subsequent to the transmittal thereof from MTA 28 but prior to the receipt thereof by MTA 40, during step 318, and/or retrieval by, accession from and/or pushing to recipient MUAs 52 A-C, during step 330. Message intended to a recipient, represented by the UID thereof, employing multiple recipient MUAs, such as MUAs 52 A-C, modified and managed by TMMA 35 at step 322, mutatis mutandis as set forth supra, in the context of SMMA 25, by generating a number of copies from the message, respective to the number of recipient MUAs established per given UID, as represented by composite entries in database 60, storing modified copies in MTA 34 or module 38 and thereafter selecting a copy of the message corresponding to the particular combinations of characteristics/properties of MUA devices, network operators, user account profile properties and/or service providers. Such a modification is defined as a modification of the second type.

In other embodiments messages modified primary by RMMA 46, at step 322, subsequent to the receipt thereof by MTA 40 during step 318 but prior to the retrieval by, accession from and/or pushing thereof to recipient MUAs 52 A-C, during step 330. Message intended to a recipient, represented by the UID thereof, employing multiple recipient MUAs, such as MUAs 52 A-C, modified and managed by RMMA 46 at step 322 mutatis mutandis as set forth supra, in the context of SMMA 25, by generating a number of copies from the message, respective to the number of MUAs established per given UID, as represented by composite entries in database 60, i.e. a plural modification, storing modified copies in MTA 40 or MDA 42 and thereafter selecting a copy of the message corresponding to the particular combination of characteristics/properties of MUA device, network operator and/or user profile properties. Such a modification is defined as a modification of the second type.

In some preferred embodiments messages modified by TMMA 36 or RMMA 46 solely upon retrieval by, accession from and/or pushing to recipient MUAs 52 A-C, during step 330. In such instances a message of a general format, which is optionally pre-modified by MPMA 24, during step 316, and/or modified SMMA 25 beforehand, during step 322, is stored by MTA 34, MTA 40, MDA 42 or module 38, during step 318, until retrieved by, accessed from and/or pushing to recipient MUAs 52 A-C, during step 330. Upon establishing of a connection, logging-in or initiating of a session by recipient MUAs 52 A-C, a temporary copy is created from the general format message, prior to execution of step 322. The temporary copy is then subjected to modification by TMMA 36 or RMMA 46, during, and the resulting modified copy is thereafter retrieved by, accessed from and/or pushed to MUAs 52 A-C, during step 330; thereafter referred to as a temporal singular modification.

Temporal singular modification of step 322 is defined as a modification of the third type and preferably preceded by a retrieval of the second type; including retrieval of modification parameters from database 60 performed by TMMA 36 and/or module 38 at step 320. The general format message is stored by MDA 42, MTA 34, MTA 40 or module 38 and managed, mutatis mutandis, in accordance with methods known in the art and particularly in accordance with post office protocol (POP) and/or internet mail access protocol (IMAP), standardized in RFC 1064 and/or MAPI and/or MAPI/RPC.

Configuration 5

In accordance with some embodiments of the present invention, reference is now made to FIGS. 2A and 3 showing electronic messages modifying system 100 as well as high-level flowchart 300 of a method for modifying electronic messages. System 100, as elaborated infra, embodies an exemplary instant messages (IM) and/or presence modifying system; presence as referred to herein inter alia standardized in RFC 2778. System 100 comprises sender moiety 112 and recipient moieties 114A to 114C. Sender moiety 112 is typically connected to recipient moieties 114A to 114C through worldwide computer network 16, which is typically referred to as the internet, and/or other telecommunication link (not shown).

Sender moiety 112 comprises sending terminal 120. In the instance of instant messaging modification, sending terminal 120 is an instant messaging/presence user agent (henceforth IMPUA), which is frequently referred at the colloquial language as client. The terminology referring to the constituents equivalent in their functionality to IMPUA is not standardized in the art, rather the following non-limiting examples are provided to illustrate the functional character thereof:

Open Mobile Alliance (OMA)-Instant Messaging and Presence Service (IMPS); OMA-Presence & Availability (PAG), OMA-Messaging (MWG); XMPP-RFC 3920, 3921, 3922, 3923, 4854, 4974, 5122.

SIMPLE-Session Initiation Protocol for Instant Messaging and Presence-RFC 3428, 3856, 3857, 3858 and 4825.

IMPUA 120 is used for the composition of electronic messages and formatting thereof, during step 312. Electronic messages produced by IMPUA 120 at step 312 in a non-limiting manner include: text, alphanumeric data, audio files, video files, graphics and hyperlinks. Various constituents of the electronic messages produced by IMPUA 120 are disposed within predefined fields allocated in an XML HTML or XHTML structured forms; wherein an instance of the latter is inter alia referred to as XHTML-IM, as defined as ad n XEP-0071 standard draft. Electronic messages generated by message generator IMPUA 120 are transmitted to MPMA 124 during step 314.

Alternatively or additionally, message generator 126 is implemented ad hoc generating numerous electronic messages in a relatively short period of time, during step 312. Message generator 126 is typically employed in consumer services and/or corporate setups, for generating numerous messages to multiple addresses, for instance for the clientele, employees, personnel or subscribers of an information service, social network, any type of client service and alike.

Optionally sender moiety 112 comprises MPMA 124. Electronic messages generated by message generator 126 during step 312 are transmitted to MPMA 124 during step 314. MPMA 124 receives incoming messages from IMPUA 120 or generator 126 at step 314 and applies a pre-modification thereto at step 316. The pre-modification applied by MPMA 124 at step 316 is mutatis mutandis essentially similar to the pre-modification applied by MPMA 24, described in more detail supra. The code of the pre-modification parameters, embedded in predefined field of an XML or HTML structured form at step 316, is typically hidden from the view of the recipient. The code of the pre-modification parameters is utilized by a MMA, at step 322, which include sender, recipient and/or transfer MMAs. Data/files necessary for the modification of step 322 are typically either included with the message or obtainable from an IP address, URI and/or URL.

The pre-modified message, containing pre-modification parameters, is transmitted to SMMA 125 or to IM/PRESENCE server 134 (hereinafter IM/PRSN) during step 318.

Configuration 6

Alternatively or additionally, sender moiety 112 of system 100 comprises SMMA 125. SMMA 125 receives incoming messages from IMPUA 120, generator 126 or MPMA 124 during step 314 and applies a modification hereto at step 316. The modification of the messages by SMMA 125 at step 322 is mutatis mutandis essentially similar to the modification applied by SMMA 25, described in more detail supra. The modification of the messages by SMMA 125 is performed during step 322 by modifying a constituent of the message intended for the recipient. The modification of the messages by SMMA 125 is performed in accordance with at least one modification parameter of the recipient, represented by the UID thereof, retrieved from database 60 during step 320. The modification of the messages by SMMA 125 is optionally performed inter alia in accordance with pre-modification parameters prescribed by MPMA 124 during step 316.

IM/PRSN 134 contains updated data about the recipient moieties 114A to 114C. Partially, these data are essentially similar to the modification parameters contained in database 60. Therefore, alternatively or additionally, modification of the messages by SMMA 125 is performed in accordance with modification parameters/data retrieved directly from IM/PRSN 134 during step 320. Database 60 can be integrated with IM/PRSN 134 in module 138 or form an independent constituent of system 100.

In some embodiments, updated data from IM/PRSN 134 are retrieved by or pushed, during step 340, to DBMS of database 60, which converts these data into an updated set of modification parameters and subsequently stores these parameters in database 60. The update of modification parameters from IM/PRSN 134 at step 340 is preferably prompted upon initiation of a session with a recipient moiety, such as moieties 114A to 114C during step 330. Modification of messages at step 322 in accordance with modification parameters derived from the data obtained from IM/PRSN 134, either directly or via storage at database 60 is hereinafter referred to as modification of the fifth type.

Configuration 7

In some embodiments system 100 comprises TMMA 136. TMMA 136 modifies at step 322 messages incoming into IM/PRSN 134 during step 318. The modification of the messages by TMMA 136 at step 322 is performed in accordance with at least one modification parameter of the recipient, represented by the UID thereof, retrieved from database 60 and/or IM/PRSN 134 at step 320. TMMA 136 is optionally integrated with IM/PRSN 134 and/or database 60 into module 38 or forms an independent constituent of system 100. Database 60 optionally forms an independent constituent of system 100. Messages incoming into IM/PRSN 134 during step 318 are typically transferred to TMMA 136, modified therein at step 322, and subsequently returned to IM/PRSN 134 as an iterative step 318. If a message is intended to a recipient, represented by the UID thereof, running multiple recipient IMPUAs, such as IMPUAs 152A to 152C, the updated profile data about recipient IMPUAs is used for the creation of the respective number of copies therefor, i.e. plural modification at step 322, which are then returned to IM/PRSN 134 and as an iterative step 318 transmitted to IMPUAs 152A to 152C in recipient moieties 114A to 114C.

In other embodiments the messages incoming into IM/PRSN 134 at step 318 are transferred to TMMA 136, modified therein at step 322, and subsequently relayed directly to IMPUAs 152A to 152C in recipient moieties 114A to 114C during step 330. If a message is intended for a recipient, represented by the UID thereof, running multiple recipient IMPUAs, such as IMPUAs 152A to 152C, the UID is preferably employed for the construction of a dynamic composite entry of modification parameters for each particular IMPUA, at step 320, which are further used for modifying respectively the copy addressed to that particular IMPUA, i.e. temporal singular modification. The copy modified by TMMA 136 at step 322 is then transmitted to IMPUAs 152A to 152C an step 330. TMMA 136 in such instance is furnished with message relaying capabilities for transmitting the message to recipient moieties 114A to 114C at step 330 and/or an iterative step 318.

Configuration 8

In some embodiments system 100 comprises RMMA, such as RMMAs 146A to 146C. RMMAs 146A to 146C modify messages at step 322 incoming, respectively, into recipient moieties 114A to 114C at step 318. The modification of the messages by RMMAs 146A to 146C is typically performed at step 322 in accordance with modification parameters retrieved from database 60 and/or IM/PRSN 134 at step 320. In other embodiments the modification of the messages by RMMAs 146A to 146C is performed at step 322 in accordance with modification parameters obtained from the machines operable in running IMPUAs 152A to 152C. If the modification of step 322 is performed in accordance with modification parameters associated with the machines running IMPUAs 152A to 152C, RMMAs 146A to 146C are preferably provided with pre-modification parameters as well as modification parameters. Pre-modification parameters can be provided at step 316 by MPMA 124 and/or TMMA 136, which in the latter instance acts as a MPMA.

Configuration 9

Figure 2B:
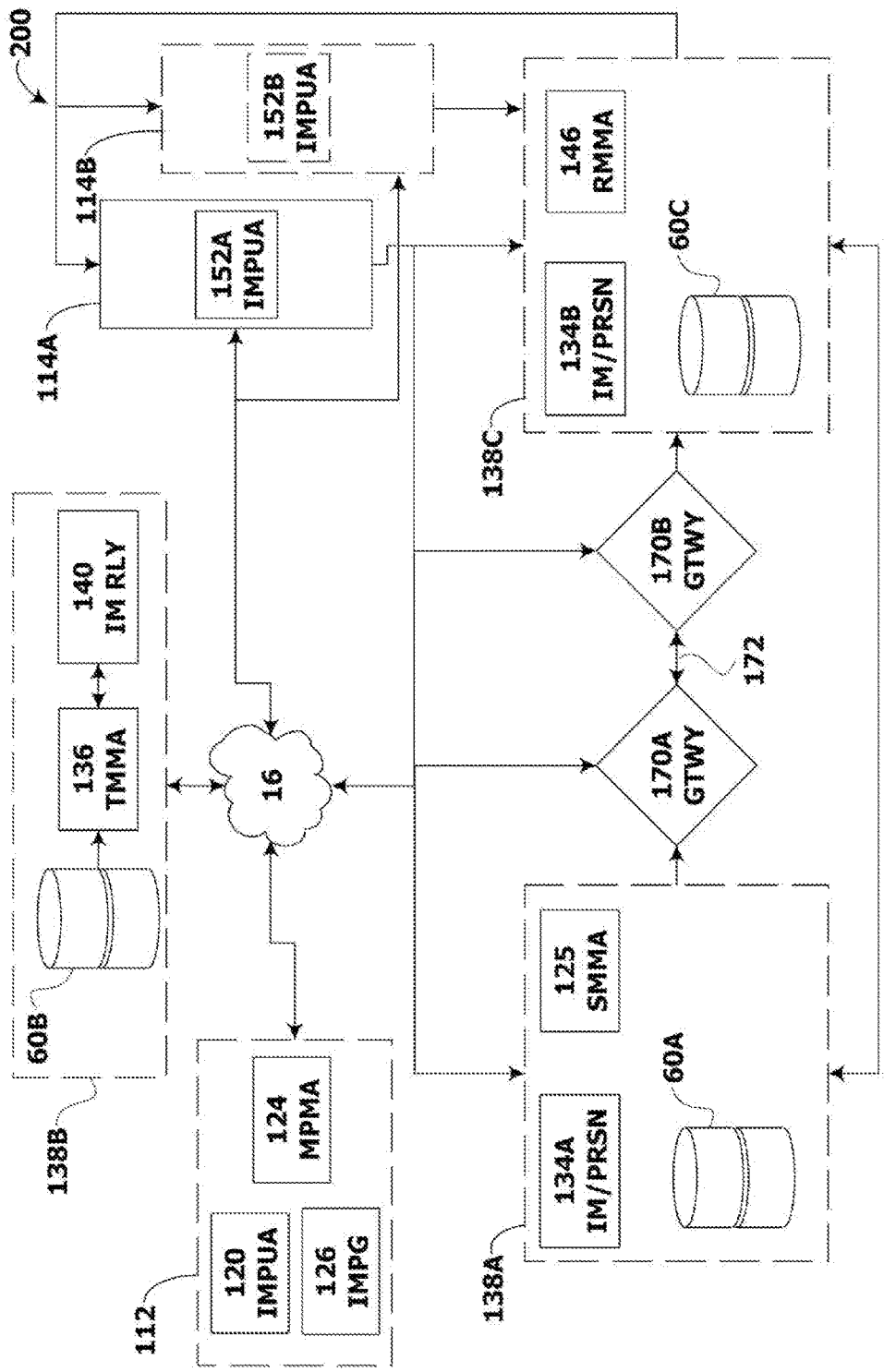
FIG. 2B is a schematic high-level block diagram of yet another embodiment of the system of the invention implementable for modification of instant messages and/or presence messaging on cross-platform configuration.

In accordance with some embodiments of the present invention, reference is now made to FIGS. 2B and 3, showing electronic messages modifying system 200 as well as high-level flowchart 300 of a method for modifying electronic messages. System 200 comprises sender moiety 112 and recipient moieties 114A and 114B. Sender moiety 112 is typically connected to recipient moieties 114A to 114C through computer network 16. Sender moiety 112 comprises sending terminal IMPUA 120 or message generator 126 implemented for generating numerous electronic messages, during step 112. Sender moiety 112 may further include MPMA 124 for applying a pre-modification to the messages, at step 316, originating from IMPUA 120 or generator 126, substantially as described hereinabove.

System 200 comprises IM/PRSN 134A, receiving incoming messages from IMPUA 120 and/or generator 126 in sender moiety 112 at step 318 and handles these messages essentially as known in the art, for instance as specified by OMA-IMPS, OMA-PAG, OMA-MWG, XMPP and/or SIMPLE standards' collections, referred to supra. IM/PRSN 134A server is optionally integrated with SMMA 125 in module 138A. In some embodiments MPMA 124 is operable in sender moiety 112; whereas in other embodiments MPMA (not shown) is operable in or integrated with SMMA 125 and/or IM/PRSN 134A in module 138A.

Database 60A optionally contains pre-modification parameters. In some embodiments database 60A is integrated with IM/PRSN 134A and/or SMMA 125 in module 138A. In others embodiments, database 60A forms an independent constituent of system 200. In yet others embodiments SMMA 125 retrieves modification parameters from databases 60B and/or 60C. Database 60 is updated at step 340 in accordance with methods disclosed hereinabove and/or from IM/PRSN 134A.

IM/PRSN 134A typically transfers incoming messages to SMMA 125 or MPMA (not shown) in module 138A. The pre-modification and/or modification of the messages respectively by MPMA (not shown) and/or SMMA 125 is performed, substantially as described hereinabove. The modification of the messages by SMMA 125 is typically performed at step 322 in accordance with at least one modification parameter of the recipient, represented by the UID thereof, retrieved from database 60A at step 320 and/or in accordance with pre-modification parameters prescribed by MPMA 124 in moiety 112 and/or MPMA (not shown) in module 138A at step 316. The modification of the messages by SMMA 125 is optionally performed in accordance with modification parameters derived from the data obtained from IM/PRSN 134A, at step 320 either directly or via storage at database 60A, i.e. modification of the fifth type.

After being pre-modified at step 316 and/or modified at step 322 by MPMA (not shown) in module 138A and/or SMMA 125, the messages are typically either directly transmitted therefrom at step 318 or returned to IM/PRSN 134A and thereafter transmitted to the recipient moiety/moieties at step 318, such as moieties 114A to 114B, or to instant messaging and/or presence relay 140 (henceforth IM/PRSN RLY); in the former instance MPMA (not shown) in module 138A and/or SMMA 125 is furnished with message relaying capabilities for transmitting the messages at step 318.

Configuration 10

In some embodiments system 200 comprises TMMA 136. In some instances, MPMA (not shown) in module 138A and/or SMMA 125 and/or IM/PRSN 134A, are configured to send the messages directly to IM/PRSN RLY 140; whereas in other embodiments messages directed to the recipient moiety/moieties, such as moieties 114A to 114B, are intercepted and delivered to IM/PRSN RLY 140, by a mechanism similar to the MX record exchange, described in more detail at the context of system 100. Particular examples of such an intercepting mechanism include ENUM servers, operation of which is inter alia standardized in RFC 3761, RFC 3762, RFC 3764, RFC4725.

After receiving incoming messages at step 318 IM/PRSN RLY 140 transfers these messages to TMMA 136. TMMA 136 modifies the received messages at step 322 in accordance with at least one modification parameter, retrieved from database 60B, at step 320 essentially as described supra. TMMA 136 is optionally integrated with IM/PRSN RLY 140 and/or database 60B into module 138B or forms an independent constituent of system 200; database 60 optionally also forms an independent constituent of system 200. Database 60 is updated at step 340 in accordance with methods disclosed hereinabove and/or from IM/PRSN 134A and/or IM/PRSN 134B. The data from IM/PRSN 134A and/or IM/PRSN 134B is typically either pushed at step 340 to the DBMS of database 60B by IM/PRSN 134A and/or IM/PRSN 134B or retrieved by the DBMS therefrom. Some instances triggering an update of database 60B at step 340 by pushing data from IM/PRSN 134A and/or IM/PRSN 134B thereto include initiation of a session with an IMPUA, such as IMPUAs 152A to 152B in moieties 114A to 114B at step 330, and/or resumption of an active status thereof. Database 60B is optionally updated from databases 60A and/or 60C at step 340.

If a message is intended for a recipient, represented by the UID thereof, currently running multiple recipient IMPUAs, such as IMPUAs 152A to 152B, the updated profile data from IM/PRSN 134A and typically from IM/PRSN 134B about recipient IMPUAs is used for the creation of the respective number of copies therefor at step 322, i.e. plural modification, which are then returned to IM/PRSN RLY 140 and subsequently transmitted to IMPUAs 152A to 152B in recipient moieties 114A to 114B during step 318.

In other embodiments if a message is intended for a recipient, represented by the UID thereof, currently running multiple recipient IMPUAs, such as IMPUAs 152A to 152B, the UID is preferably employed for the construction of a dynamic composite entry of modification parameters for each particular recipient IMPUA at step 320, which are further used for modifying respectively the copy addressed to that particular IMPUA at step 322, i.e. temporal singular modification. The copy modified by TMMA 136 is then transmitted to IMPUAs 152A to 152B directly at step 330 or returned to IM/PRSN RLY 140 at step 318 and then transmitted therefrom; TMMA 136 in the former instance is furnished with message relaying capabilities for transmitting the message to recipient moieties 114A to 114B.

Configuration 11

In some embodiments sender moiety 112 and recipient moieties, such as moieties 114A and 114B, of system 200 are implemented on different platforms, for instance Twitter®, Skype®, Windows Live®, Facebook® or Google Talk®. In such a case, system 200 comprises at least one gateway, such as gateways GTWY 170A and GTWY 170B. GTWY 170A and GTWY 170B act an IM/PRSN relay, capable of converting the message to a format compatible with IMPUA and/or IM/PRSN of the recipient platform at step 318; essentially as known in the art; exemplarily references to GTWY include XMPP-CORE-01, SIP-XMPP-IM-01, SIP-XMPP-CHAT-03, XMPP-PRESENCE-02. GTWY 170A and GTWY 170B are connected via interconnect link 172 or internet 16.

After converting, GTWY 170A and/or GTWY 170B at step 318 transmit the messages to IM/PRSN 134B. IM/PRSN 134B is typically configured similarly to IM/PRSN 134A. IM/PRSN 134B contains updated profile data about recipient IMPUAs, such as IMPUAs 152A to 152B, in recipient moieties 114A to 114B. IM/PRSN 134B is optionally integrated with RMMA 146 in module 138B. In some embodiments database 60C is integrated with IM/PRSN 134B and/or RMMA 146 in module 138A. In others embodiments, database 60C forms an independent constituent of system 200. In yet others embodiments RMMA 146 retrieves modification parameters from databases 60A and/or 60B at step 320. Database 60C is updated in accordance with methods disclosed hereinabove and/or from IM/PRSN 134B at step 340.

IM/PRSN 134B typically transfers incoming messages to RMMA 146 at step 318. The modification of the messages by RMMA 146 is performed at step 322 substantially as described hereinabove. The modification of the messages by RMMA 146 is typically performed in accordance with at least one modification parameter of the UID, retrieved from database 60C at step 320 and/or in accordance with pre-modification parameters prescribed by MPMA 124 at step 316 in moiety 112 and/or MPMA (not shown) in module 138A. The modification of the messages by RMMA 146 is optionally performed at step 322 in accordance with modification parameters derived from the data associated with given UI obtained from IM/PRSN 134C, either directly or via storage at database 60C, at step 320, i.e. modification of the fifth type.

After being modified by RMMA 146, at step 322, the messages are typically either directly relayed therefrom or returned IM/PRSN 134B and thereafter transmitted to recipient IMPUAs, such as IMPUAs 152A to 152B in moieties 114A to 114B at step 330; in the former instance RMMA 146 is furnished with message relaying capabilities for transmitting the messages to recipient IMPUAs.

The modification of the messages by RMMA 146 is optionally performed at step 322 in accordance with at least one pre-modification parameter prescribed by MPMA 124 in moiety 112 and/or MPMA (not shown) in module 138A at step 316. Sender moiety 112, module 138A and/or module 138B incorporate SMMA 125 and/or TMMA 136 may act as an MPMA; whereas database 60A and/or 60B optionally contain pre-modification parameters.

In some embodiments the messages are intercepted on their way from IM/PRSN 134A to GTWY 170A and/or GTWY 170A to GTWY 170B and/or GTWY 170B to IM/PRSN 134A or otherwise delivered to IM/PRSN RLY 140 at step 318 and the modification is performed by TMMA 136, at step 322 essentially as described hereinabove. In some embodiments TMMA 136 and/or module 138B are integrated with GTWY 170A to GTWY 170B.

Configuration 12

Commonly, in the art, sender IMPUA and recipient IMPUA/s are implemented on the same platform, for instance Twitter®, Skype®, Windows Live®, Facebook® or Google Talk®. Therefore, in some preferred embodiments sender moiety 112 and recipient moieties, such as moieties 114A and 114B, of system 200 are implemented on a unitary proprietary platform. In such a case, system 200 typically comprises merely a single IM/PRSN server (not shown) and does not include GTWY 170A and GTWY 170B, somewhat similar to the configuration depicted in FIG. 2A but wherein the modification is performed at step 322 on the IM/PRSN level.

Accordingly, in such configurations, IM/PRSN 134A and IM/PRSN 134B are the very same constituent of system 200 (not shown). Moreover in such configurations, SMMA 125 and RMMA 146 are the very same constituent of system 200 (not shown), which are optionally integrated with the single IM/PRSN (not shown) into a module, such as module 138A or 138B.

System 200 typically comprises a single database, such as database 60A or 60C, integrated with the single IM/PRSN (not shown) and/or a single MMA (not shown), performing the function of SMMA 125 and RMMA 146, at step 322, depending on the direction the message is sent to. In some instances, an external database, such as database 60B, is used for the storage of modification parameters and the single MMA (not shown), performing the functions of SMMA 125 and RMMA 146, at step 322, retrieves the modification parameters therefrom at step 320. If sender/recipient employs multiple IMPUAs, the modification performed at step 322 by the single MMA can be a plural or a temporal singular modification. The modification by the single MMA is preferably performed at step 322 in accordance with modification parameters derived from the data obtained from the single IM/PRSN (not shown) at step 320 of system 200.

Configuration 13

In some embodiments of the present invention, the electronic messages modifying system is dedicated for modification of presence messaging. Presence protocols are standardized, inter alia, in OMA-IMPS, OMA-PAG, XMPP and/or SIMPLE standards' collections, referred to supra and/or in proprietary protocols. In such embodiments the following terminology is commonly used in the art in lieu of foregoing:

IMPUA and IM/PRSN—PUA and PRSN, respectively;
sender—presentity;
recipient—watcher;
sending message—publishing;
receiving message via pull step—fetching;
receiving message via push step—notifying.

Characteristics of presence messaging systems as oppose to IM systems typically include: a) frequent publishing of one or more presence attributes by the presentity at step 318, b) usually a plurality of watchers, whom are typically subscribed or associated with the presentity, and c) obtainment of the messages by watchers at step 330, which are not subscribed or associated with the presentity, inter alia via a fetching step; whereas in IM the messages are typically delivered to the recipient via push step.

Therefore, in embodiments dedicated for modification of presence messages, in addition to the modifications of either of the five types defined hereinabove, optionally a modification of the message at step 322 is performed in accordance with the recent or last presence attribute/s as provided by and/or associated with the presentity as obtained at step 320, henceforth referred to as the modification of the sixth type. One type of a presence attribute is often colloquially referred to as status. Database of modification parameters (not shown) is optionally updated from/by the PRSN of the watcher at step 340.

In some instances, the presence attribute/s of the presentity is/are utilized for deriving therefrom pre-modification parameters for step 316. In such instances, the MPMA (not shown) retrieves the presence attribute/s of the presentity from the presentity PRSN preferably prior to steps 314 or 316. Optionally the MPMA (not shown) is integrated with the PRSN of the presentity. Database of pre-modification parameters (not shown) is optionally updated from/by the PRSN of the presentity at step 340.

Typically, watchers that are subscribed to or associated with the presentity receive the message via a notification step 330. If a watcher, as established by the UID thereof, employs multiple recipient IMPUAs, such as IMPUAs 152A to 152B in moieties 114A to 114B, typically a plural modification is applied to the message at step 322, as elaborated supra. Watchers that are neither subscribed to nor associated with the presentity typically receive the message via a fetching step. If a watcher, as established by the UID thereof, neither subscribed to nor associated with the presentity, employs multiple recipient IMPUAs, such as IMP-UAs 152A to 152B in moieties 114A to 114B, typically a singular temporal modification is applied to the message at step 322, as described hereinabove.

Configuration 14

In some embodiments of the present invention, the electronic messages modifying system is dedicated chiefly to the modification of electronic mail and presence messaging, in such a manner that a particular source or a group of sources is selected from a plurality of sources for any given information; whereby an electronic mail or presence message is modified at step 322 in accordance with at least one modification parameter and/or presence attribute of the recipient/watcher UID, in combination with properties of the recipient/watcher MUA, IMPUA or PUA machine, qualities/characteristics of the service provided by the network operator and/or qualities/characteristics of external service providers.

For example A, B, C and D are recipients/watchers of a sender/presentity, which is an information service, such as a financial alert service, scientific articles or news service. In one instance, information service lists numerous articles for a single informational subject, available from different sources; thus topical economic issues are typically provided independently by several different financial newspapers. The information service, e.g. Google News, associates the articles from several different sources (X, Y and Z) as pertaining to the same topical issue; thereby allowing the users to opt a preferred source for a given topical issue. In another instance, a scientific article or a patent cites several other reference articles, whereas the information service, e.g. a scientific articles portal, such as PubMed, associates the reference articles, possibly from different sources (X, Y and Z), as cited in a given scientific article. A characteristic of both examples is that a single informational subject, such as a topical economic issue or scientific article, is associated with several other articles, respectively, such as articles or cited references from several different sources.

Continuing the example above, recipient/watcher A is registered to source X and recipient/watcher B is registered to source Y. Recipient/watcher C is registered to sources X and Y (having a computer program compatible with source X installed on device 1 and computer program compatible with source Y installed on device 2), whereas recipient/watcher D is not registered to neither of the sources X, Y or Z but frequently uses a free of charge online sources. Sources X and Y require paid registration, whereas source Z provides a free of charge news service.

Upon a publication of a new article by sources X, Y and Z associated with the financial alert service sender/presentity, the MMA optionally modifies that message at step 322 in the following manner: recipient/watcher A will receive a link for the article provided by source X; recipient/watcher B will receive a link for the article provided by source Y; recipient/watcher C will receive a link for the article provided by source X to device 1 and a another link for the informational subject provided by source Y installed to device 2; whereas recipient/watcher D will receive a message with a link to the article provided by source Z.

According to the other example, upon publication of a new scientific article citing references available from several sources X, Y and Z (such as Since-Direct® and Elsevier®) and associated with the scientific articles sender/presentity, the MMA optionally modifies a message at step 322 in the following manner: recipient/watcher A will receive a message with notification regarding the new scientific article with a link for the cited reference available from source X and Z, as well as an invitation to register to source Y;

recipient/watcher B will receive a message with notification regarding the new scientific article with a link to the cited references available from source Y and Z, as well as an invitation to register to source X; recipient/watcher C will receive a message with notification regarding the new scientific article with a link to the cited references available from source X, Y and Z; whereas recipient/watcher D will receive such a message with a link for the cited reference available from source Z and an invitation to register to sources X and Y.

In other instances the MPMA of the information service sender/presentity sets pre-modification parameters in the message, according to which if MMA determines that a particular recipient/watcher is registered to a given source, such a recipient/watcher will receive a notification and/or a link to the article available from said source; whereas if MMA determines that a particular recipient/watcher is not registered to a given source, such a recipient/watcher will receive a message with an invitation to register to said source and/or will receive a message merely with links to sources that provide a free of charge service and/or will receive the message merely if at least one free of charge sources is associated with the informational subject.

It will be appreciated by persons skilled in the art that the present invention is not limited by what has been particularly shown and described herein above. Thus the modification of electronic messages in accordance with various embodiments of the present invention is performable by either of SMMA 25, TMMA 36 RMMA 46, SMMA 125, TMMA 136, RMMA 146 as well as by any combination thereof. Moreover, the pre-modification parameters set by MPMA 24, MPMA 124 in moiety 112 and/or MPMA (not shown) in module 138A, can be utilized in modification by either of SMMA 25, TMMA 36 RMMA 46, SMMA 125, TMMA 136 and/or RMMA 146 as well as by any combination thereof, as a modification of the first type.

It is further emphasized that various embodiments and/or configurations of the method/system of the present invention are typically furnished with backward compatibility support. Thus a message for which modification cannot be established or fails for any reason whatsoever is optionally not modified but rather forwarded by SMMA 25, TMMA 36, RMMA 46, SMMA 125, TMMA 136, and/or RMMA 146. Furthermore, if solely modification parameters of a particular category or categories is/are established for a given message, the message is merely partially modified in a respective manner. Moreover, similar modification parameters from different categories are preferably assigned with a priority order; for instance, the modification parameter associated with UID, such as parameters from the fourth category, e.g. indicative of the service the recipient is typically registered to assigned with a preeminent priority order and overrules the modification parameter indicative of the services the recipient is registered to from any other category.

It is ultimately noted that SMMA 25, TMMA 36, RMMA 46, SMMA 125, TMMA 136 and/or RMMA 146 optionally stores and manages the retrieved records of modification parameters in a local manner. Thus if modification parameters cannot be established for a given message, the set of modification parameters used for the previous modification can be used. Modification parameters stored and managed as records by SMMA 25, TMMA 36, RMMA 46, SMMA 125, TMMA 136 and/or RMMA 146 can be assigned with an expiration date and/or time.

Moreover, if modification parameters cannot be established for a given message and/or a conditional action prescribed by a pre-modification parameter dictates so and/or established modification parameter dictates so, optionally, no modification is performed on the message and/or further transmitting of the message and/or delivery thereof to the recipient is not performed.

The constituent of internet denoted in the drawings and specification hereinabove is not to be construed as an exclusive or sole internet connection, rather the internet is denoted due to the functional meaning thereof, e.g. entailing resolving with the DNS the destination IP address of an MX record, SRV record, etc. It is further elucidated that all and any of the line connectors in the drawings are in a non-limiting manner indicate connections via internet, proxy configuration, direct cable connection and/or integration.

It should be acknowledged that the access to the database containing the modification parameters, such as databases 60, 60A, 60B or 60C, in FIGS. 1 to 2B, is typically assigned with permissions and/or certification levels. Permissions are typically set by the DBMS and or from terminal interface, such as terminal interface 64, dedicated ad hoc inputting user profile properties and/or preferences. Permissions are typically assigned as for sources updating the database as well as MMAs, such as SMMA 25, TMMA 36 RMMA 46, SMMA 125, TMMA 136 and/or RMMA 146, retrieving data therefrom.

It is stressed that in the sake of brevity not all actual combinations of modules, agents and/or various other constituents from different configurations and/or embodiments are explicitly disclosed in the specification hereinabove. The emphasis instead has been made on the characteristics of such constituents and functional context thereof. Therefore, numerous non-disclosed combinations of modules, agents and/or various other constituents from different configurations and/or embodiments are contemplated by the present disclosure. In some instances, a cross-connectivity between a moiety of IM and/or presence with moiety/moieties of E-mail configuration/s is envisaged.

It would be appreciated that the system and method of the invention is not implementable for defense against spam or unsolicited messages. On the contrary to Evans, who teaches a system for filtering of spam emails. Email filtering according to Evans as well as other prior art techniques is based on recipient's preferences and utilizes well-defined criteria in order to determine whether messages should get to the recipient or not. Email filtering according to Evans and prior art belongs to the class of rule-based spam filters, wherein well-defined parameters such as time, sender's email address and expiration date, are utilized in order to determine whether messages should get to the recipient or not. The spam email filtering systems known in the art primarily filter email messages and is not aimed at modifying the messages. Although Evans teaches a spam email filtering system with very limited capabilities of modifying the messages, such modification is rather uniform and respectively derived from the decision of the spam filtering system (whether message should get to the recipient) and merely manifests which decision was reached by the spam filtering system. Contradistinctively to Evans, the system for modification of messages and presence according to the instant invention is operational in customizing electronic and presence messages based on dynamic parameters of the recipient, such as the list of applications currently installed on recipient's device, physical location of the recipient and etc.

It would be further appreciated that the modification parameters in accordance with the present invention are not updated by the recipient himself/herself but rather are automatically streamed and obtained in a dynamic manner from various sources, such as [i] a process actively initiated by a machine associated with the message user agent of said recipient; [ii] a process actively initiated by a provider of communication services for a machine associated with the message user agent of said recipient; [iii] a process actively initiated by the database management system of said database, and [iv] a process initiated by a service provider other than the provider of communication services for the machine associated with the message user agent of said recipient.

It should be ultimately appreciated that contradistinctively to prior art, the modification parameters in accordance with the present invention are unrelated to intrinsic characteristics, such as the message size, identity of the sender, sender's domain, content of the message and/or attachment thereof, but rather pertain to at least one of: (a) the machine associated with the message user agent of the recipient, (b) the service provider of network communication for the message user agent of the recipient, (c) user profile properties of the recipient, (d) pre-modification parameters defining a conditional action performed upon meeting a pre-defined condition as well as (e) information of the recipient obtained from external service provider or subscription services.

CITATION LIST

U.S. Pat. Nos. 7,392,289, 6,119,137, 7,010,757, 6,707,890 and 6,529,942
US patent application Ser. Nos. 2002/120600, 2008/077675, 2009/106650, 2002/016818, 2002/0147778, 2005/159135, 2006/168642, 2005/136908, 2006/041657, 2003/123104, 2005/0278651, 2008/0222254 and 2008/220798
German patent or patent application Ser. No. 102005042068
European patent application Ser. No. 1646001
International patent publications No. 2010/023192 and 2007/014351
RFC 2045, RFC 2046, RFC 2047, RFC 4288, RFC 4289 RFC 2049 and RFC 2388; RFC 2778, RFC 2779, RFC 3761, RFC 3762, RFC 3764, RFC 4725, RFC 3920, RFC 3921, RFC 3922, RFC 3923, RFC 4854, RFC 4974, RFC 5122, RFC 3428, RFC 3856, RFC 3857, RFC 3858 and RFC 4825 available from the Internet Engineering Task Force (IETF) at http://tools.ietf.org/html
XEP-0071 XHTML standard available from IM XMPP Foundation at http://xmpp.org/extensions/xep-0071.html
xmpp-core-01 standard available at http://tools.ietf.org/html/draft-saintandre-XMPP-CORE-01
sip-xmpp-im-01 standard available at http://tools.ietf.org/html/draft-saintandre-sip-xmpp-im-01
sip-xmpp-chat-03 available at http://tools.ietf.org/html/draft-saintandre-sip-xmpp-chat-03
xmpp-presence-02 available at http://tools.ietf.org/html/draft-saintandre-sip-xmpp-presence-02
Open Mobile Alliance standards: Instant Messaging and Presence Service (IMPS), Presence & Availability (PAG) and Messaging (MWG) available from Parlay X Web Services API standards available at http://www.parlayx.com;
E-mail agent (infrastructure). (2010 Sep. 1). In Wikipedia, The Free Encyclopedia. Retrieved 01:06, Nov. 15, 2010, from http://en.wikipedia.org/w/index.php?title=E-mail_agent_(infrastructure)&oldid=382207110
MIME. (2010 Nov. 5). In Wikipedia, The Free Encyclopedia. Retrieved 16:45, Nov. 15, 2010, from http://en.wikipedia.org/w/index.php?title=MIME&oldid=394975047

What is claimed is:

1. A method of modifying electronic messages, said method comprises:
   (a) composing at least one electronic message by at least one member selected from the group consisting of: a sending terminal and message generator;
   (b) pre-modifying said at least one message by a pre-modification agent, said pre-modifying comprises prescribing at least one pre-modification parameter to said at least one message, wherein said pre-modification parameter defines a conditional action performed in respect to at least one constituent of said message, performed upon meeting a predefined criterion;
   (c) providing access to at least one modification parameters database, said database comprising a plurality of modification parameters;
   (d) retrieving an updated set of said modifications parameters from said database;
   (e) modifying at least one constituent of said message, by a message modification agent, in accordance with at least one parameter selected from the group consisting of:
      [i] said modification parameters retrieved from said database;
      [ii] said at least one pre-modification parameter prescribed by said pre-modification agent, and
      [iii] a combination of said modification parameters and said at least one pre-modification parameter;
   (f) receiving said message, as modified by said message modification agent, by a message user agent and presenting said modified message to a recipient;
   (g) dynamically updating said modification parameters in said database upon at least one event selected from the group consisting of:
      [i] a process actively initiated by a machine associated with said message user agent of said recipient;
      [ii] a process actively initiated by a provider of communication services for a machine associated with said message user agent of said recipient;
      [iii] a process actively initiated by the database management system of said database;
   wherein said method is not implementable for defense against spam or unsolicited messages;
   wherein said modification parameters in said database are not updated by the recipient himself/herself, and
   wherein said modification parameters are unrelated to the characteristics of said message;
   wherein said modification parameters in said database are dynamically updated prior to said modifying of said at least one constituent of said message;
   wherein a datum/file necessary for said modification is selected from the group consisting of: a datum/file contained within attachments of said message, datum/file obtainable from an IP address, datum/file obtainable via a URI and/or datum/file obtainable from a URL.

2. The method of modifying electronic messages as set forth in claim 1, wherein said modification parameters in said database comprising at least one modification parameter selected from the group consisting of:
   (a) a modification parameter pertaining to said machine associated with said message user agent of said recipient;
   (b) a modification parameter selected from the group consisting of: a type and/or model of hardware components of said machine; a configuration of said hardware components of said machine; a state and/or capacity of at least one of said hardware components; a type and/or model of the firmware installed in a memory of said machine; dynamic properties of said machine; a type and/or model of the operating system running on said machine; a list of software applications operable on said machine; a list of content accessible by said machine, and preferences and/or configurations of software components on said machine;

(c) a modification parameter pertaining to said service provider of network communication for said message user agent of said recipient;

(d) a modification parameter selected from the group consisting of: ambient conditions; a strength and/or availability of the cellular network signal; geographical location and/or present time; availability and/or the bandwidth of network connection; types of services said recipient is subscribed to and customer profile data of said recipient;

(e) a modification parameter selected from the group consisting of: parameters associated with a particular messaging account, parameters associated with particular person; parameters associated with particular entity; parameters establishing a unique identity of said recipient; parameters associated with personal information of said recipient, gender of said recipient, age of said recipient, wearing glasses by said recipient, hearing impairment of said recipient, other disabilities of said recipient, marital status of said recipient, hometown of said recipient, language preference of said recipient, preferences specified for the messaging account of said recipient; message box quota and/or current available size at the messaging account of said recipient, last time and/or device accessed a messaging account of said recipient, information related to devices used to access a messaging account of said recipient; information related to analysis performed by a messaging account manager of a messaging account of said recipient;

(f) a modification parameter provided by an external service provider;

(g) a modification parameter selected from the group consisting of: a parameter associated with information services, parameter associated with subscription services, parameter associated with social networks; parameter associated with consumer services of said recipient; parameter associated with a message address; parameter associated with credentials of said recipient, parameter related to a unique ID of said service provider; parameter related to logical IP address of said machine associated with said message user agent; parameter related to IMEI address of said machine; parameter related to MAC address of said machine; browsing and/or usage patterns and/or history associated with said recipient; contact list and/or social graph associated with said recipient; device currently used and/or devices used before by said recipient; advertisement consumed on a particular service; purchase history of said recipient; available credit of said recipient; preferences specified by said recipient.

3. The method of modifying electronic messages as set forth in claim 1, wherein said modification parameters in said database are provided by at least one member selected from the group consisting of an appliance and inventory system configured to monitor amount and/or the condition of goods stored therein.

4. The method of modifying electronic messages as set forth in claim 1, wherein said modifying comprises at least one type of modification selected from the group consisting of:

(a) modification of a first type, performed in accordance with pre-modification parameters prescribed by said message pre-modification agent;

(b) modification of a second type, performed upon at least one event selected from the group consisting of:
  [i] receipt of an incoming message by a message transfer agent, and
  [ii] receipt of an incoming message by said message modification agent;

(c) modification of a third type, performed upon at least one event selected from the group consisting of:
  [i] access to an incoming message by said message user agent of said recipient;
  [ii] retrieval of an incoming message by said message user agent of said recipient, and
  [iii] pushing an incoming message to said message user agent of said recipient;

(d) modification of a fourth type, performed in accordance with modification parameters other than these retrieved from said database;

(e) modification of the fifth type, performed accordance with modification parameters derived from data obtained from an IM/PRSN server, in at least one way selected from the group consisting of:
  [i] directly from said IM/PRSN server, and
  [ii] via storage at said database;

(f) modification of a sixth type, performed in accordance with at least one attribute of a watcher;

(g) temporal singular modification performed on a message delivered to a plurality of different message user agent of said recipient;

(h) plural modification performed on a message delivered to a plurality of different message user agent of said recipient.

5. A method of modifying electronic messages, said method comprises:

(a) composing at least one electronic message;

(b) providing access to at least one modification parameters database, said database comprising a plurality of modification parameters;

(c) retrieving at least one updated modification parameter from said database;

(d) modifying at least one constituent of said message, by a message modification agent, in accordance with at least one parameter retrieved from said database;

(e) receiving said message, as modified by said message modification agent, by a message user agent and presenting said modified message to a recipient;

(f) dynamically updating said modification parameters in said database by at least one member selected from the group consisting of: a machine associated with said recipient message user agent, a database management system of said database;

wherein said method is not implementable for defense against spam or unsolicited messages;

wherein said modification parameters in said database are not updated by the recipient himself/herself, and wherein said modification parameters are unrelated to characteristics of said message;

wherein said modification parameters in said database are dynamically updated prior to said modifying of said at least one constituent of said message;

wherein a datum/file necessary for said modification is selected from the group consisting of: a datum/file contained within attachments of said message, datum/ file obtainable from an IP address, datum/file obtainable via a URI and/or datum/file obtainable from a URL.

6. The method of modifying electronic messages, as set forth in claim 5, further comprises pre-modifying said at least one message by a pre-modification agent, said pre-modifying comprises prescribing at least one pre-modification parameter to said at least one message, wherein said pre-modification parameter defines a conditional action performed in respect to at least one constituent of said message, upon meeting a predefined criterion.

7. The method of modifying electronic messages, as set forth in claim 6, further comprises modifying at least one constituent of said message, by said message modification agent, in accordance with at least one parameter selected from the group consisting of:
[i] said at least one pre-modification parameter prescribed by said pre-modification agent;
[ii] said modification parameters retrieved from said database, and
[iii] a combination of said at least one pre-modification parameter and said modification parameters retrieved from said database.

8. The method of modifying electronic messages as set forth in claim 5, wherein said dynamically updating is performed upon at least one event selected from the group consisting of:
[i] a process actively initiated by a machine associated with said message user agent of said recipient;
[ii] a process actively initiated by a provider of communication services for a machine associated with said message user agent of said recipient;
[iii] a process actively initiated by the database management system of said database, and
[iv] a process initiated by a service provider other than said provider of communication services.

9. The method of modifying electronic messages as set forth in claim 5, wherein said modification parameters in said database comprising at least one modification parameter selected from the group consisting of:
(a) a modification parameter pertaining to said machine associated with said message user agent of said recipient;
(b) a modification parameter selected from the group consisting of: a type and/or model of hardware components of said machine; a configuration of said hardware components of said machine; a state and/or capacity of at least one of said hardware components; a type and/or model of the firmware installed in a memory of said machine; dynamic properties of said machine; a type and/or model of the operating system running on said machine; a list of software applications operable on said machine; a list of content accessible by said machine, and preferences and/or configurations of software components on said machine;
(c) a modification parameter pertaining to said service provider of network communication for said message user agent of said recipient;
(d) a modification parameter selected from the group consisting of: ambient conditions; a strength and/or availability of the cellular network signal; geographical location and/or present time; availability and/or the bandwidth of network connection; types of services said recipient is subscribed to and customer profile data of said recipient;
(e) a modification parameter selected from the group consisting of: parameters associated with a particular messaging account, parameters associated with particular person; parameters associated with particular entity; parameters establishing a unique identity of said recipient; parameters associated with personal information of said recipient, gender of said recipient, age of said recipient, wearing glasses by said recipient, hearing impairment of said recipient, other disabilities of said recipient, marital status of said recipient, hometown of said recipient, language preference of
(f) said recipient, preferences specified for the messaging account of said recipient; message box quota and/or current available size at the messaging account of said recipient, last time and/or device accessed a messaging account of said recipient, information related to devices used to access a messaging account of said recipient; information related to analysis performed by a messaging account manager of a messaging account of said recipient;
(g) a modification parameter provided by an external service provider;
(h) a modification parameter selected from the group consisting of: a parameter associated with information services, parameter associated with subscription services, parameter associated with social networks; parameter associated with consumer services of said recipient; parameter associated with a message address; parameter associated with credentials of said recipient, parameter related to a unique ID of said service provider; parameter related to logical IP address of said machine associated with said message user agent; parameter related to IMEI address of said machine; parameter related to MAC address of said machine; browsing and/or usage patterns and/or history associated with said recipient; contact list and/or social graph associated with said recipient; device currently used and/or devices used before by said recipient; advertisement consumed on a particular service; purchase history of said recipient; available credit of said recipient; preferences specified by said recipient.

10. The method of modifying electronic messages as set forth in claim 5, wherein said modifying comprises at least one type of modification selected from the group consisting of:
(a) a modification of a first type, performed in accordance with a pre-modification parameter prescribed by a message pre-modification agent;
(b) a modification of a second type, performed upon at least one event selected from the group consisting of: receipt of an incoming message by a message transfer agent, and receipt of an incoming message by said message modification agent;
(c) a modification of a third type, performed upon at least one event selected from the group consisting of: access to, retrieval of and pushing of an incoming message by said message user agent of said recipient;
(d) a modification of a fourth type, performed in accordance with modification parameters other than these retrieved from said database;
(e) modification of the fifth type, performed accordance with modification parameters derived from data obtained from an IM/PRSN server, in at least one way selected from the group consisting of:
[i] directly from said IM/PRSN server, and
[ii] via storage at said database;
(f) a modification of a sixth type, performed in accordance with at least one attribute of a watcher;

(g) a temporal singular modification performed on a message delivered to a plurality of different message user agent of said recipient;

(h) a plural modification performed on a message delivered to a plurality of different message user agent of said recipient.

11. The method of modifying electronic messages as set forth in claim 5, wherein said message user agent is an instant messaging/presence user agent or wherein said message user agent further comprises connectivity to an instant messaging/presence server.

12. The method of modifying electronic messages as set forth in claim 11, wherein said dynamic update of said modification parameters in said database is performed in accordance with data derived from said instant messaging/presence server.

13. The method of modifying electronic messages as set forth in claim 5, wherein said modification parameters are retrieved by said modification agent from at least one source selected from the group consisting of:

[i] said database;

[ii] an instant messaging/presence server, and

[iii] said machine associated with said message user agent.

14. The method of modifying electronic messages as set forth in claim 5, wherein said dynamic update of said modification parameters in said database is performed prompted upon initiation of a session with said message user agent.

15. The method of modifying electronic messages as set forth in claim 5, wherein said sending terminal or said message generator and said user agent are implemented on different communication platforms, further comprises directing said message via at least one gateway, which acts as an instant messaging and/or presence relay, capable of converting a message into a format compatible with the platform of said user agent.

16. The method of modifying electronic messages as set forth in claim 5, wherein said user agent is a plurality of different user agents associated with a singular unique identity (UID) of said recipient.

17. The method of modifying electronic messages as set forth in claim 16, wherein said modifying is performed in accordance with modification parameters allocated within said database in at least one composite entry, comprising a plurality of sub-entries associated with said singular unique identity (UID).

18. The method of modifying electronic messages as set forth in claim 1, wherein said dynamic update of said modification parameters in said database is performed prompted upon initiation of a session with said message user agent.

19. A computer-readable storage medium, having computer-executable instructions stored thereon which, when executed by a computer micro-processor modify electronic messages, said computer-executable instructions comprise:

(a) an instruction to compose at least one electronic message;

(b) an instruction to provide access to at least one modification parameters database, said database comprising a plurality of modification parameters;

(c) an instruction to retrieve at least one updated modification parameter from said database;

(d) an instruction to modify at least one constituent of said message, by a message modification agent, in accordance with at least one parameter retrieved from said database;

(e) an instruction to receive said message, as modified by said message modification agent, by a message user agent and presenting said modified message to a recipient;

(f) an instruction to dynamically update said modification parameters in said database by at least one member selected from the group consisting of: a machine associated with said recipient message user agent, a database management system of said database;

wherein said computer-executable instructions do not defend against spam or unsolicited messages;

wherein said modification parameters in said database are not updated by the recipient himself/herself, and wherein said modification parameters are unrelated to characteristics of said message;

wherein said modification parameters in said database are dynamically updated prior to said modifying of said at least one constituent of said message;

wherein a datum/file necessary for said modification is selected from the group consisting of: a datum/file contained within attachments of said message, datum/file obtainable from an IP address, datum/file obtainable via a URI and/or datum/file obtainable from a URL.

\* \* \* \* \*